US010909093B2

United States Patent
Panwar et al.

(10) Patent No.: US 10,909,093 B2
(45) Date of Patent: Feb. 2, 2021

(54) EXTERNAL SYSTEM INTEGRATION INTO AUTOMATED ATTRIBUTE DISCOVERY

(71) Applicant: BDNA CORPORATION, Mountain View, CA (US)

(72) Inventors: Rajendra Bhagwatisingh Panwar, Mountain View, CA (US); Abe Achkinazi, Sunnyvale, CA (US)

(73) Assignee: BDNA Corporation, Itasca, IL (US)

( * ) Notice: Subject to any disclaimer, the term of this patent is extended or adjusted under 35 U.S.C. 154(b) by 136 days.

(21) Appl. No.: 16/221,867

(22) Filed: Dec. 17, 2018

(65) Prior Publication Data
US 2019/0138506 A1    May 9, 2019

Related U.S. Application Data

(63) Continuation of application No. 11/998,635, filed on Nov. 29, 2007, now Pat. No. 10,157,195.

(51) Int. Cl.
| | | |
|---|---|---|
| *G06F 16/00* | (2019.01) | |
| *G06F 16/21* | (2019.01) | |
| *G06F 9/54* | (2006.01) | |
| *G06F 16/25* | (2019.01) | |
| *G06F 16/28* | (2019.01) | |

(52) U.S. Cl.
CPC ............. *G06F 16/212* (2019.01); *G06F 9/54* (2013.01); *G06F 16/25* (2019.01); *G06F 16/254* (2019.01); *G06F 16/258* (2019.01); *G06F 16/289* (2019.01)

(58) Field of Classification Search
CPC .......................... G06F 16/212; G06F 16/258
See application file for complete search history.

(56) References Cited

U.S. PATENT DOCUMENTS

| | | |
|---|---|---|
| 10,157,195 B1 | 12/2018 | Panwar et al. |
| 2006/0136462 A1 | 6/2006 | Campos et al. |

(Continued)

OTHER PUBLICATIONS

U.S. Appl. No. 11/998,635 Office Action dated Nov. 22, 2017.
(Continued)

*Primary Examiner* — Grace Park
(74) *Attorney, Agent, or Firm* — Knobbe, Martens, Olson & Bear, LLP

(57) ABSTRACT

Methods and apparatus to transform attribute data about assets in a source system data model into attribute data about the same assets in a target system data model. The first step is to extract the necessary attribute data from attribute data collected about inventory assets of a business entity needed to populate the attributes in objects representing those inventory assets in a target system data model. Transformation rules are written which are designed to make all conversions necessary in semantics, units of measure, etc. to transform the source system attribute data into attribute data for the target system which has the proper data format. These transformation rules are executed on a computer on the extracted attribute data and the transformed attribute data is stored in an ER model. In the preferred embodiment, the transformation rules are object-oriented in that transformation rules for subtypes can be inherited from their parent types or classes. An export adapter which is capable of invoking the application programmatic interface of the target system CMDB is then used to export the transformed attribute data stored in the ER model to the target system CMDB.

19 Claims, 34 Drawing Sheets

(56) References Cited

U.S. PATENT DOCUMENTS

| | | |
|---|---|---|
| 2007/0038651 A1 | 2/2007 | Bernstein et al. |
| 2009/0012983 A1 | 1/2009 | Senneville et al. |
| 2009/0063318 A1 | 3/2009 | Alonzo et al. |
| 2018/0068001 A1 | 3/2018 | Panwar et al. |
| 2018/0096053 A1 | 4/2018 | Panwar et al. |

OTHER PUBLICATIONS

U.S. Appl. No. 11/998,635 Final Office Action dated May 31, 2017.
U.S. Appl. No. 11/998,635 Office Action dated Feb. 22, 2010.

TO FIG. 8B

16M_IPADDRESS
| PK | ID |
|---|---|
| | NAME |
| | LABEL |
| | LAST_MODIFIED_DATE |
| | DOTNOTATION |
| | IPLABEL |
| | DESCRIPTION |

16 M_IP INTERFACE
| PK | ID |
|---|---|
| | NAME |
| | LABEL |
| | LAST_MODIFIED_DATE |
| | STATUS |
| | IPIFLABEL |
| | DESCRIPTION |

TO FIG. 8B

16M_OPENVMS
| PK,FK1 | ID |
|---|---|
| | NAME |
| | LABEL |
| | LAST_MODIFIED_DATE |
| | BOOTTIME |
| | OSUNAME |
| | KERNELVERSION |
| | OSVERSION |
| | OSMODE |
| | OSNAME |
| | RELEASE |
| | MODIFIER |
| | OSLEVEL |
| | MAJORVERSION |
| | OSLABEL |
| | DESCRIPTION |

16M_ID_IPADDRESS
| PK | ID |
|---|---|
| | NAME |
| | LABEL |
| | LAST_MODIFIED_DATE |
| | TBL_TYPE |
| | TBL_NAME |
| | PROJ_ID |
| | UNREAD_FLAG |

16M_L2INTERFACE
| PK | ID |
|---|---|
| | NAME |
| | LABEL |
| | LAST_MODIFIED_DATE |
| | HWADDRESS |
| | L2NAME |
| | L2LABEL |
| | DESCRIPTION |

TO FIG. 8B

16M_LOCALFS
| PK,FK1 | ID |
|---|---|
| | NAME |
| | LABEL |
| | LAST_MODIFIED_DATE |
| | AVAILABLESPACE |
| | MOUNTPOINT |
| | FSTYPE |
| | CAPACITY |
| | FSLABEL |
| | DESCRIPTION |

16M_SOLARISFS
| PK,FK1 | ID |
|---|---|
| | NAME |
| | LABEL |
| | LAST_MODIFIED_DATE |
| | AVAILABLESPACE |
| | MOUNTPOINT |
| | FSTYPE |
| | CAPACITY |
| | MANAGEDSYSTEMNAME |
| | FSLABEL |
| | DESCRIPTION |

TO FIG. 8B

| A | B | C | D | E |
|---|---|---|---|---|
| | F | G | H | |

16M_UNIXFS
PK, FK1: ID
NAME
LABEL
LAST_MODIFIED_DATE
AVAILABLESPACE
MOUNTPOINT
FSTYPE
CAPACITY
MANAGEDSYSTEMNAME
FSLABEL
DESCRIPTION

16M_WINDOWSFS
PK, FK1: ID
NAME
LABEL
LAST_MODIFIED_DATE
AVAILABLESPACE
MOUNTPOINT
FSTYPE
CAPACITY
MANAGEDSYSTEMNAME
FSLABEL
DESCRIPTION

16M_OPENVMSFS
PK, FK1: ID
NAME
LABEL
LAST_MODIFIED_DATE
AVAILABLESPACE
MOUNTPOINT
FSTYPE
CAPACITY
MANAGEDSYSTEMNAME
FSLABEL
DESCRIPTION

16M_AIX
PK, FK1: ID
NAME
LABEL
LAST_MODIFIED_DATE
BOOTTIME
OSUNAME
KERNELVERSION
OSVERSION
OSMODE
OSNAME
RELEASE
MODIFIER
OSLEVEL
MAJORVERSION
OSLABEL
DESCRIPTION

16M_SOLARIS
PK, FK1: ID
NAME
LABEL
LAST_MODIFIED_DATE
BOOTTIME
OSUNAME
KERNELVERSION
OSVERSION
OSMODE
OSNAME
RELEASE
MODIFIER
OSLEVEL
MAJORVERSION
OSLABEL
DESCRIPTION

16M_HPUX
PK, FK1: ID
NAME
LABEL
LAST_MODIFIED_DATE
BOOTTIME
OSUNAME
KERNELVERSION
OSVERSION
OSMODE
OSNAME
RELEASE
MODIFIER
OSLEVEL
MAJORVERSION
OSLABEL
DESCRIPTION

| A | B | C | D | E |
|---|---|---|---|---|
| F | G | H | | |

16M_LINUX

| PK,FK1 | ID |
|---|---|
| | NAME |
| | LABEL |
| | LAST_MODIFIED_DATE |
| | BOOTTIME |
| | OSUNAME |
| | KERNELVERSION |
| | OSVERSION |
| | OSMODE |
| | OSNAME |
| | RELEASE |
| | MODIFIER |
| | OSLEVEL |
| | MAJORVERSION |
| | OSLABEL |
| | DESCRIPTION |

16M_UNIX

| PK,FK1 | ID |
|---|---|
| | NAME |
| | LABEL |
| | LAST_MODIFIED_DATE |
| | BOOTTIME |
| | OSUNAME |
| | KERNELVERSION |
| | OSVERSION |
| | OSMODE |
| | OSNAME |
| | RELEASE |
| | MODIFIER |
| | OSLEVEL |
| | MAJORVERSION |
| | OSLABEL |
| | DESCRIPTION |

| A | B | C | D | E |
|---|---|---|---|---|
| | F | G | H | |

FIG. 8H

Combining multiple elements to a single entity

Two elements linked together by containment relationship

Relationship between the Operating System Report and the Database Report

EXTERNAL SYSTEM INTEGRATION INTO AUTOMATED ATTRIBUTE DISCOVERY

CROSS-REFERENCE TO RELATED APPLICATIONS

This application is a continuation of and claims the priority benefit of U.S. patent application Ser. No. 11/998,635 filed Nov. 29, 2007, the disclosure of which is incorporated herein by reference.

BACKGROUND OF THE INVENTION

It is useful for companies to know exactly what assets they have for many different reasons, but it is difficult to know this for large companies and governmental entities. Manually collecting such data on a periodic basis is expensive and time consuming. Systems have been developed by companies such as BDNA of Mountain View, Calif. to take automated inventory of assets. IBM Tivoli is another such system.

Sometimes, customers have IBM or BMC CMDB structured databases (the IBM Tivoli Change and Configuration Management Database or CMDB) of their assets and the attributes thereof but the customer likes the way automated inventory collection of attribute data about a company's assets is collected by another system such as the BDNA automated inventory software provided by BDNA in Mountain View, Calif. The BDNA software stores the attribute data in a different format and with different semantics than other systems like IBM CMDB. Sometimes in such situations, the customer may wish to continue to use the IBM CMDB data model but use BDNA software to collect the attribute data about the customer's assets. In such cases, it is useful to be able to extract automatically collected asset attribute data from BDNA data repositories and be able to make that data available on other data repositories such as those provided in asset management systems or inventory systems developed by IBM and BMC. A system to map from one data model to another and make all changes in semantics, data types, class structure, inheritance relationships, etc. is needed to do this.

The IBM Tivoli CMDB has configuration and tracking functionality that does automated, agentless discovery of the assets in use by an entity and their configuration and application dependencies. The items discovered are called Configuration Items or CIs for short. Wikipedia defines a Configuration Item as "a collection of objects related to the specific functionality of a larger system." Discovery information about a system is one aspect of a CI, but there is usually other information about each CI maintained in its CMDB. For example, Number of trouble tickets an administrator has logged against a computer system; original set of applications installed on it; and, how they were configured. Discovery data is used to reconcile/enforce known data about a CI against item. For example, the discovery data may include: Current list of applications found in the system; or, up times collected about the system.

Another source defines a Configuration Item as:

"... any component of an information technology infrastructure that is under the control of configuration management. Configuration Items (CIs) can be individually managed and versioned [sic], and they are usually treated as self-contained units for the purposes of identification and change control.

All configuration items (CIs) are uniquely identified by names, version numbers, and other attributes. CIs vary in complexity, size and type. They can range from an entire service which may consist of hardware, software and documentation, to a single program module or a minor hardware component."

It is useful to be able to transform inventory attribute data discovered by other automated inventory discovery systems such as the one provided by the assignee of the present invention, BDNA, into the IBM Tivoli CMDB data model, for the reasons given above. In such cases, it makes sense to provide a layer of isolation and mapping between the BDNA internal data structures and the outside system and only expose through the layer the necessary models and data of the BDNA system. This intermediary layer allows the BDNA system and data structures to continue to evolve without impacting the use of BDNA data in external systems.

The framework and functionality of the intermediate layer:

1) provides a layer of isolation between the BDNA internal data model and what is exposed to outside sources;

2) map out and helps solve differences between the BDNA data model for the discovery data and the data model representation of an outside source or target system;

3) provide runtime support for processing BDNA's discovery data into normalized data required by the external system in the form of a java code snippet.

4) provide a consistent, scalable and manageable way of processing the BDNA model and extracting it to an outside target.

BRIEF DESCRIPTION OF THE FIGURES

FIG. 8A to FIG. 8H illustrate a block diagram of the IBM ER Model.

SUMMARY OF THE INVENTION

Figure 1A:
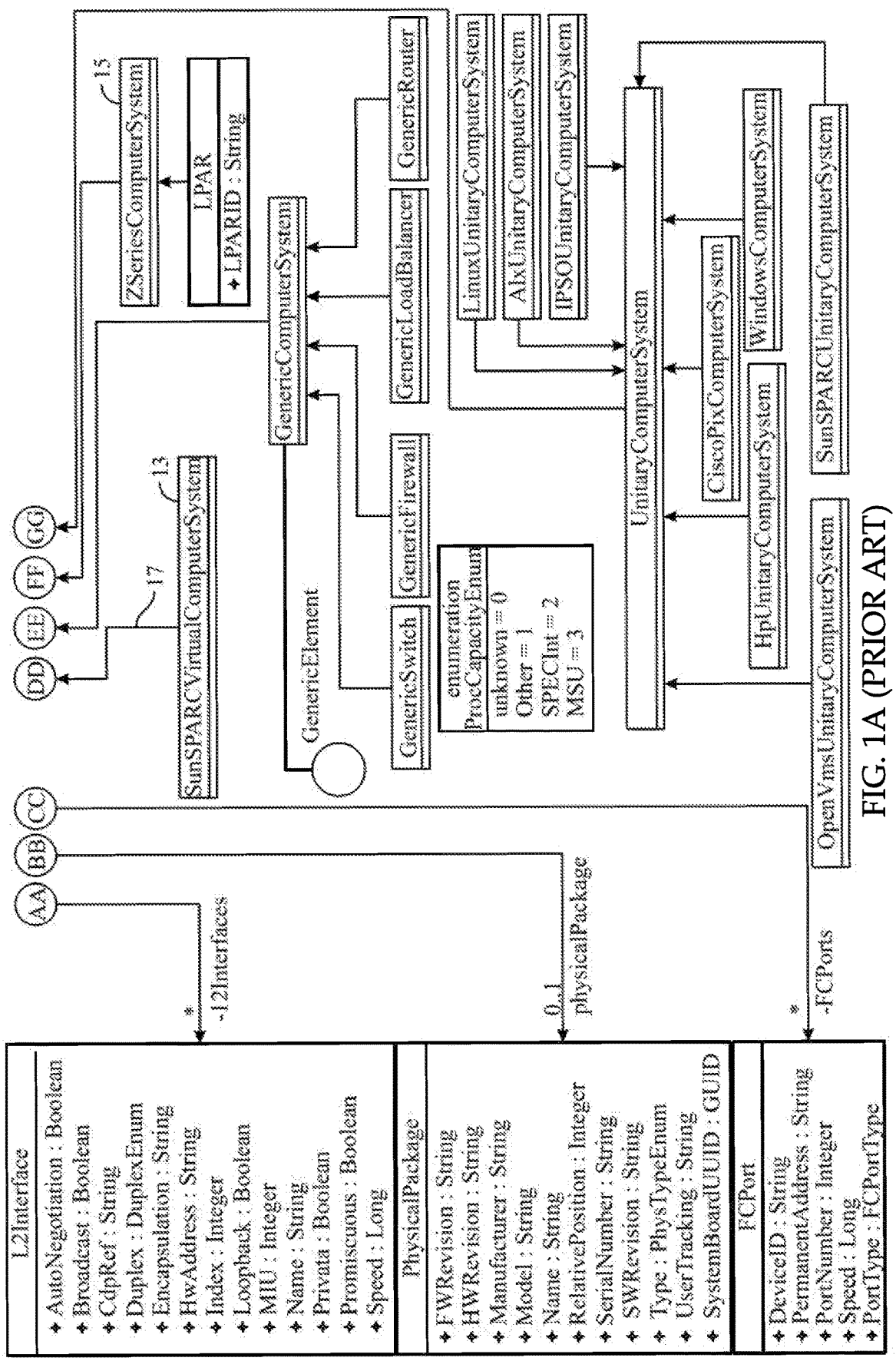
FIG. 1A to FIG. 1C illustrate a multipage data model diagram illustrating some of the Configuration Items in the IBM CMDB data model.

Embodiments that implement the teachings of the invention will do mapping from one data model to another. This is done using:

1) Means for extracting the necessary attribute data from the source system to represent the same assets having those attributes in the target system. In various embodiments, this is done using BQL reports or any other method of selecting the attribute data about one or more assets in the source system needed to make up instances in one or more classes representing the same type assets in the target system. Typically, this is done using a computer programmed to run BQL reports, but dedicated hardware circuits could also be used.

2) Means for transforming the attribute data from the format it is in for the data model of the source system to the format of the data model for the target system. In the preferred embodiment, this is done using a transformation engine which executes transformation rules. These rules are written by hand by an analyst who understands the difference between the source system data model and the target system data model and then writes computer programs that control a computer to transform the attribute data from the source system into attribute data having the proper format for the target system. The transformed attribute data is then stored temporarily in an ER model of the target system.

3) Means for exporting the transformed attribute data to the target system. In the preferred embodiment, this is implemented with an export adapter that is conversant with the application programmatic interface of the target system and which functions to make the appropriate function calls and supply the appropriate arguments from the ER model data to properly store the ER model data in the target system. The export adapters are basically drivers for the target system.

The BQL reports are generated by software running on a computer which controls the computer to select the attribute data needed from the source system to make up each Configuration Item (CI or class or type) in the target system. The BQL reports are typically computer programs which control a computer to extract the source system attribute data and store it in a store coupled to the transformation engine. A transformation engine is typically implemented by executing transformation rules programs on a computer. The transformation rules are written by an analyst that understands the differences in semantics, data types and units of measure between the source system and the target system. The export adapters are typically software programs which are executed on a computer, the software controlling the computer being conversant with the application programmatic interface (API) of the target system and controlling the computer to export the transformed attribute data into the target system.

In the preferred embodiment, the transformation rules are organized in an object oriented format. What this means is that since the objects in the target system data model are organized into parent and subtype objects, i.e., CI and subtype CIs, the transformation rules can be so-organized also. The preferred embodiment method involves identifying for each CI with subtype CIs in the target system which attributes are common in that all the subtype CIs inherit those attributes from the parent CI. Transformation rules for those common attributes are then written and stored in an object which is the parent of subtype objects. The subtype objects store transformation rules which are unique to the subtype objects attributes stored in the subtype objects in the target system data model.

When the attributes of a subtype object in the target system data model are to be populated, the transformation rules of the parent object are used to transform the attribute data of the corresponding parent object in the source system data model into the data format of the target system data model's parent object. The transformed attribute data that is common to parent object (CI) is then exported to the target system data model and used to populate the parent object (CI) and the inherited attributes of all the subtype or child objects (subtype Cls). The transformation rules for the attributes which are unique to each subtype object (subtype CI) are then used to transform the attribute data of the subtype objects in the source data system into the data format of attribute data of the subtype objects in the target data system. The transformed attribute data for each subtype object is then exported into the appropriate subtype objects of the target system.

DETAILED DESCRIPTION OF THE VARIOUS EMBODIMENTS

The process of exporting inventory attribute data developed by systems such as those marketed by BDNA (hereafter BDNA discovered data) into the data bases or data structures of other system fundamentally involves a mapping process to resolve differences between the data structure (data model) of the BDNA discovered data and the data structure or data model of a target system.

Figure 1B:
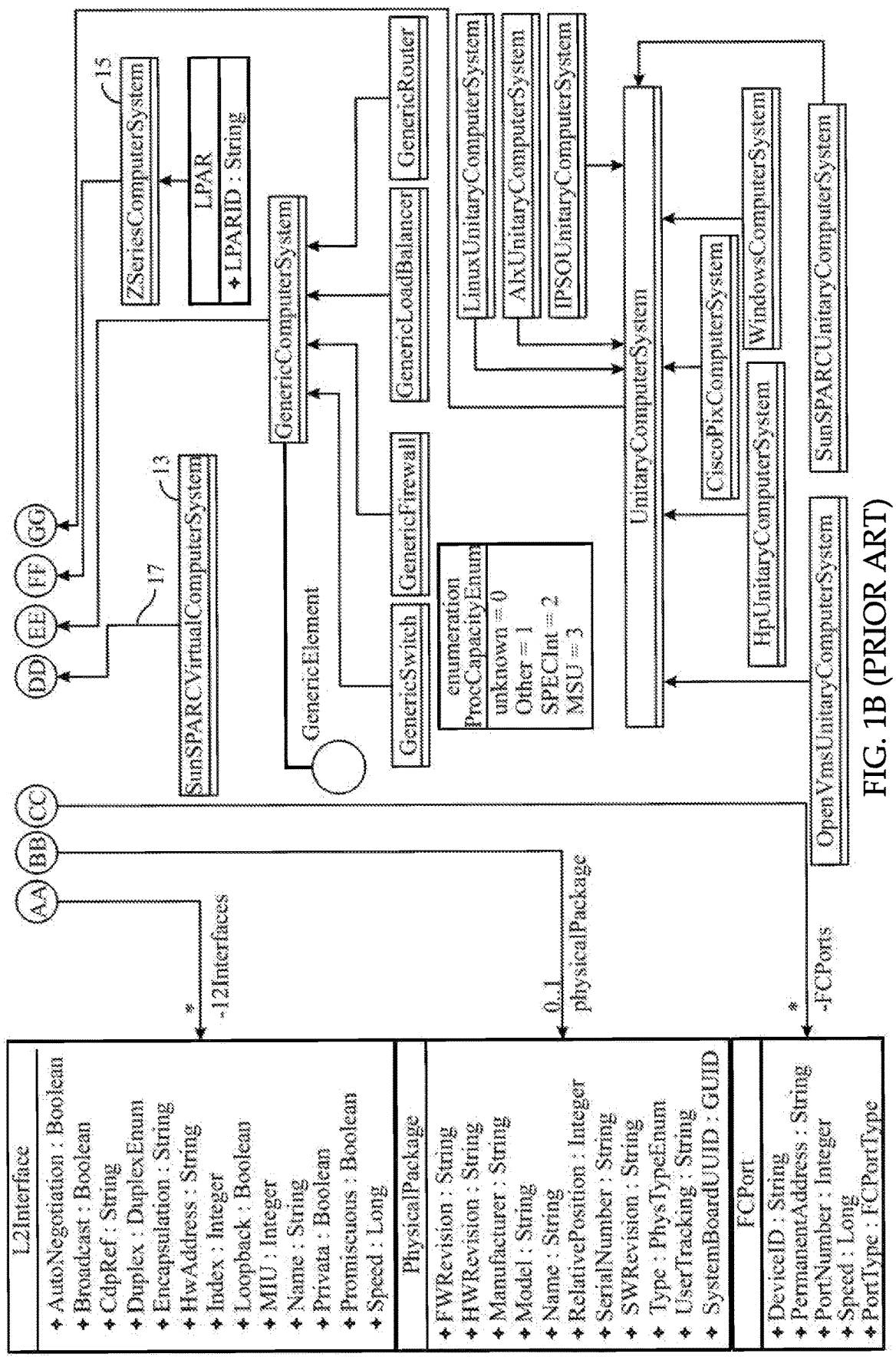
Figure 1C:
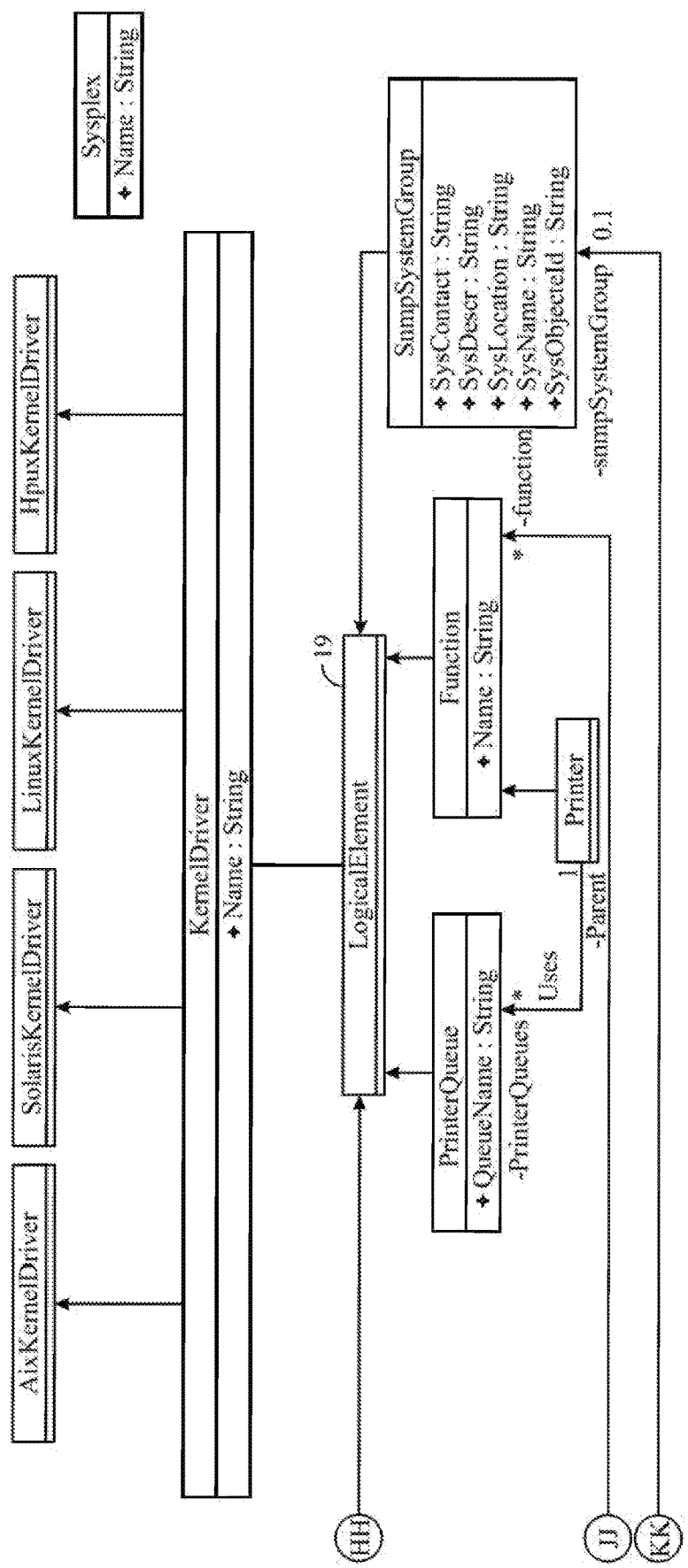

FIG. 1A to FIG. 1C illustrate a multipage data model diagram illustrating some of the Configuration Items in the IBM CMDB data model. This is a conceptual model only in the form of a class diagram and is not how the data is actually stored in their database. A CMDB is a common store where all the information about the IT assets of an entity are stored, and it has a data structure or data model which is independent of the data structure of discovery data discovered by discovery tools such as the BDNA discovery tool. A data model is a class diagram which defines the classes of objects, each object's attributes and genus-species relationships, i.e., the subtypes or species of each genus or type (class) of object and the containment relationships. A containment relationship is a relationship such as an operating system is installed on a computer. A genus species relationship is, for example, computer system is the genus and Sun Sparc station is a species of computer system. A database is an implementation of a data model like FIG. 1A to FIG. 1C with specific tables. The characteristics that define a data model are the class structure and the relationships between the classes. The names and attributes of each class and its subtypes and the attributes specific to the subtype are defined and which classes are subtypes of other classes is defined as is the relationship of which classes of asset types are installed on other classes of asset types is also defined. How the instances of devices within the class structure are stored is irrelevant to the data model itself.

Vendors that define CMDB data models like IBM generally market discovery tools which configure the discovered attribute data about assets in a way compatible with that vendor's CMDB. But sometimes, customers want to use other discovery tools that are not configured to generate discovery data in a data format compatible with a CMDB data model the customer wishes to use. In such a case, a transformation system to convert the discovery data into the data structured used in the CMDB is useful.

Each block in FIG. 1A to FIG. 1C represents a Configuration Item or CI in the data model. A CI is a type of an asset such as a computer or an operating system, etc. A CI is basically a class object with a listing of attributes. For example, there is a CI 11 for ComputerSystem which has the attributes listed in the box 11 such as architecture, CPU speed, CPU type, manufacturer, memory size, ROM version, serial number, etc. The data model diagram shows a classic object-oriented class structure where various CI types have subtypes which inherit the attributes of the parent class but which unique attributes of their own. For example, the ComputerSystem CI 11 has the various subtypes named in the blocks such as blocks 13 and 15 representing subtypes of computer systems for SunSPARCVirtualComputerSystem and ZSeriesComputerSystem, respectively. Each of these is a separate species of the generic ComputerSystem type. The lines with arrowheads, such as line 17, indicate these type and subtype relationships. The CI box on the arrowhead end of line 17 represents the genus CI or the common attributes that all the subtype CI boxes (on the "feathers" end of the arrow) will inherit. Each of the subtype CI will have all the attributes of the parent type and may have its own "species" attributes unique to it. These particular subtypes represent the leaf level of the class diagram tree, and those types of objects will be instantiated with instances of particular assets found in inventory which have the attribute set of that type and subtype. Some of the Cls or types are abstract such as the LogicalElement CI 19 at the top of the diagram illustrated in FIG. 1A to FIG. 1C. This CI type will never be instantiated with actual instances but it serves as the top of the class diagram tree and is generic to all the subtypes.

The containment relationships in the data model of FIG. 1A to FIG. 1C are represented by lines connecting the CI boxes, of which lines 19 and 21 are examples. Line 19 indicates that the ComputerSystem CI 11 is the parent of OperatingSystem CI 9 and is also the parent of FileSystem CI 23. These lines 19 and 21, and the cardinalities printed on them, mean that the computer system may have any number of operating systems installed on it and any number of file systems installed on it. In order to transform attribute data collected by an automated discovery system such as BDNA to data stored in a CMDB, it is necessary to gather all the attributes needed for each CI and transform that data if necessary to conform it to the data types of the attributes of the Cls. This may require unit conversion, data type conversion and recognition of semantic differences so that attributes called one thing in the source data are stored in an attribute storage memory location called something else in the target system but which means the same thing. For example, a CI for a computer system may have an attribute that measures the size of the hard disk in megabytes but the automated asset discovery system stores such an attribute in units of kilobytes. As another example, the BDNA automated asset discovery system may store the attribute CPU speed as a floating point number such as 126.4 MHz and the target system may store the CPU speed as an integer number of MHz. As another example a CI in the target system may label the CPU speed attribute "CPUSpeed" whereas the BDNA software may label the same attribute "ClockSpeed". They both mean the same thing and are the same attribute.

Figure 2:
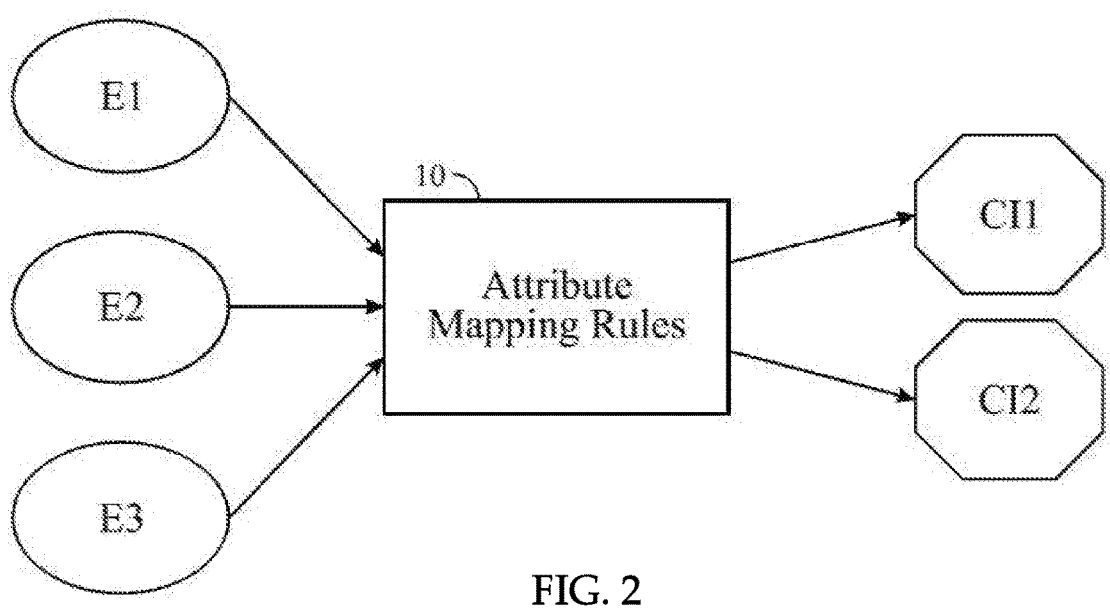
FIG. 2 is a diagram of showing how attribute mapping rules are used to map discovered element data to Configuration Items in a CMDB data structure in an m-to-n mapping.

FIG. 2 is diagram of showing how attribute mapping rules are used to map discovered element data to Configuration Items (Cis) in a CMDB data structure in an m-to-n mapping. In FIG. 2, BDNA discovered data in the form of three different discovered elements E1, E2 and E3 are input to a process 10 which uses mapping rules to create data structures of the desired output type. The elements E1, E2 and E3 could be hardware assets or software assets or any other assets on the network of the entity using the BDNA discovery software. These elements may have different names than the Cls to which they are to be transformed and the listing of attributes of the elements may be different than the CI target, but basically, they are the same thing as the target CI or Cls into which the element's attribute data are to be transformed. In the particular example of FIG. 2, the target system is a CMDB data structure, but IBM Tivoli or other data structures might also be target systems. Sometimes, the attributes of multiple elements are needed to make up a letter number of CIs. That is the purpose of the M-to-N mapping shown in the example of FIG. 2 where the attributes of three elements are transformed into the attributes of two CIs C11 and C12.

Figure 14:
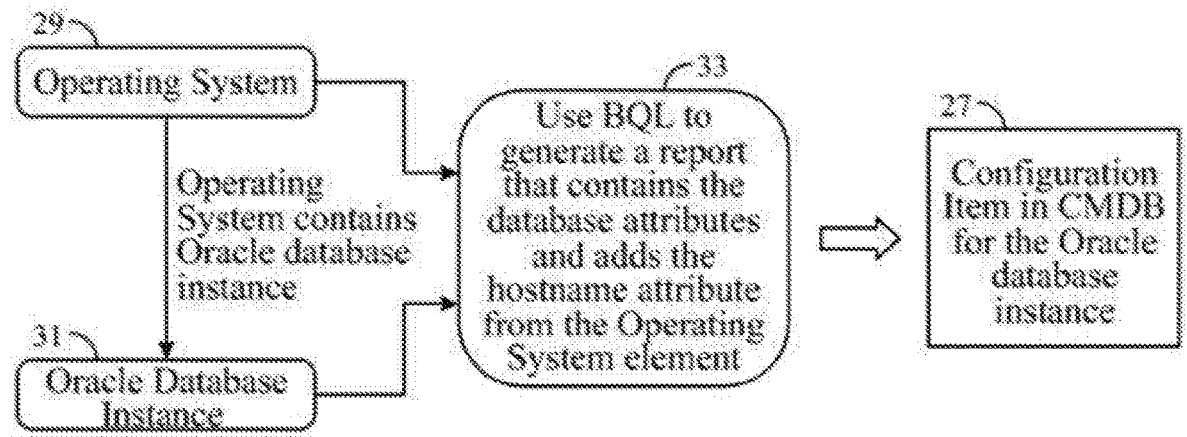
FIG. 14 is a flow diagram showing how data from two different elements discovered by the automated attribute discovery process is combined using a BQL report into a single Configuration Item in CMDB for the Oracle database instance.

One example of how to do such a conversion is:

1) Use the BVL/BQL functionality of BDNA software to combine multiple discovered elements to a single entity.

a) This done by collecting all attributes needed to create a particular Configuration Item type in CMDB in a BQL report (BQL stands for BDNA Query Language) which is then used as an input of data to an attribute mapping process. For example, a ComputerSystem CI type in CMDB may require attribute data from Network, Host and Operating system discovered elements, as related together by the container relationship in BDNA data structures of discovered elements. Several such BQL reports may have to be defined depending upon how many different Configuration Item types are to be generated. FIG. 14 is a flow diagram showing how data from two different elements discovered by the automated attribute discovery process is combined using a BQL report into a single Configuration Item in CMDB for the Oracle database instance. The Configuration Item in the CMDB to be built is box 27 and is a CI for an Oracle database. It requires information both about the operating system of the host and the Oracle Database instance. The attribute data about the operating system is represented by block 29. The attribute data about the Oracle Database Instance is represented by block 31. A BQL report 33 is generated which contains the database attributes and adds the hostname attributes about the operating system element 29.

Figure 16:
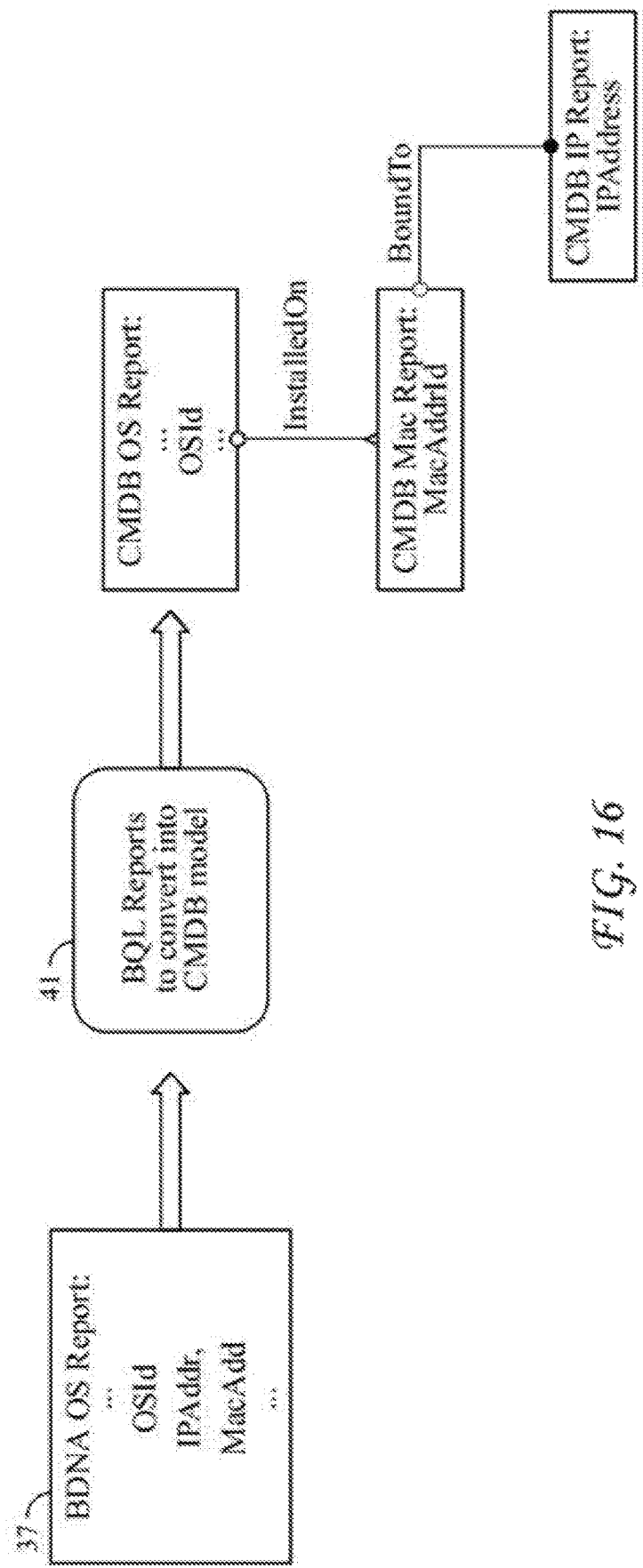
FIG. 16 is a flow diagram showing how BQL reports can also be used to split a single BDNA report into two tables and a relation expected by CMDB.

FIG. 16 is a flow diagram showing how BQL reports can also be used to split a single BDNA report into two tables and a relation expected by CMDB. In this example, the BDNA OS report 37 contains both the IP address and the MAC address but CMDB expects two tables and a relation. The BQL report 41 is used to generate a CMDB OS report containing the OSid which has a relation InstalledOn with a CMDB MAC report MACAddrid (the MAC address) which is bound to a CMDB IP report which contains the IP address. The BQL report generates the two separate CMDB reports and enforces proper constraints.

Figure 15:
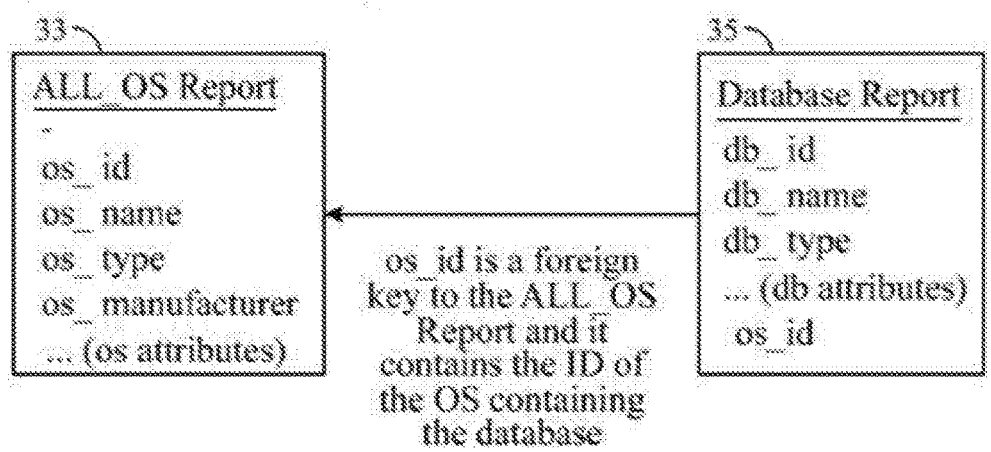
FIG. 15 is an illustration of two elements linked together by a containment relationship in the discovery data.

When the BDNA discovery software discovers attribute data, the values are stored in a special schema called the transactional store that is very generic and suitable for inserting/appending new data but not suitable for querying data (or interpreting data in a meaningful way). A language called BQL was therefore developed to generate reports that are easy to interpret from the transactional store. These reports have meaningful column names that reflect the attributes being discovered. Each report ends up stored in a database table. BQL is this query language prior art reporting mechanism that is executable and which extracts attribute data and stores it in one place. The BQL reports allow attribute data from different inventory assets to be collected and stored in one place such as a particular row of a table. In the transformation process described here, the BQL reports are used to collect all the attribute data needed for a particular CI from the attribute data of one or more assets in the inventory data and store it in one place for the transformation rules to work on. That one place is represented as box 7 of FIG. 3, labeled the input schema based on BQL reports. An alternative would be to use specialized SQL statements to generate such tables.

b) Relationships between entities will, in some embodiments, be specified by reports. For example, the relationships between ComputerSystems and Databases (parent-child) may be specified as:

i) an M-to-N relationship: a separate report that just contains the parent-child link;

ii) an 1-to-N relationship: The database report will, in some embodiments, contain a column for OS_ID (which is sort of a foreign key to an all_os table). FIG. 15 is an illustration of two elements linked together by a containment relationship in the discovery data. In this case, a relationship between the Operating System report 33 and the Database Report 35 is a containment relationship. The os_jd attribute is the common attribute which links the two reports together in the sense that it is a foreign key to the All_OS Report 33 and it contains the ID of the OS that contains the database.

c) Use entity transformation rules to map a single entity to possibly multiple CIs. In some embodiments, the BVL/BQL language may be able to implement these transformations since BQL supports user defined PUSQL functions.

Figure 3:
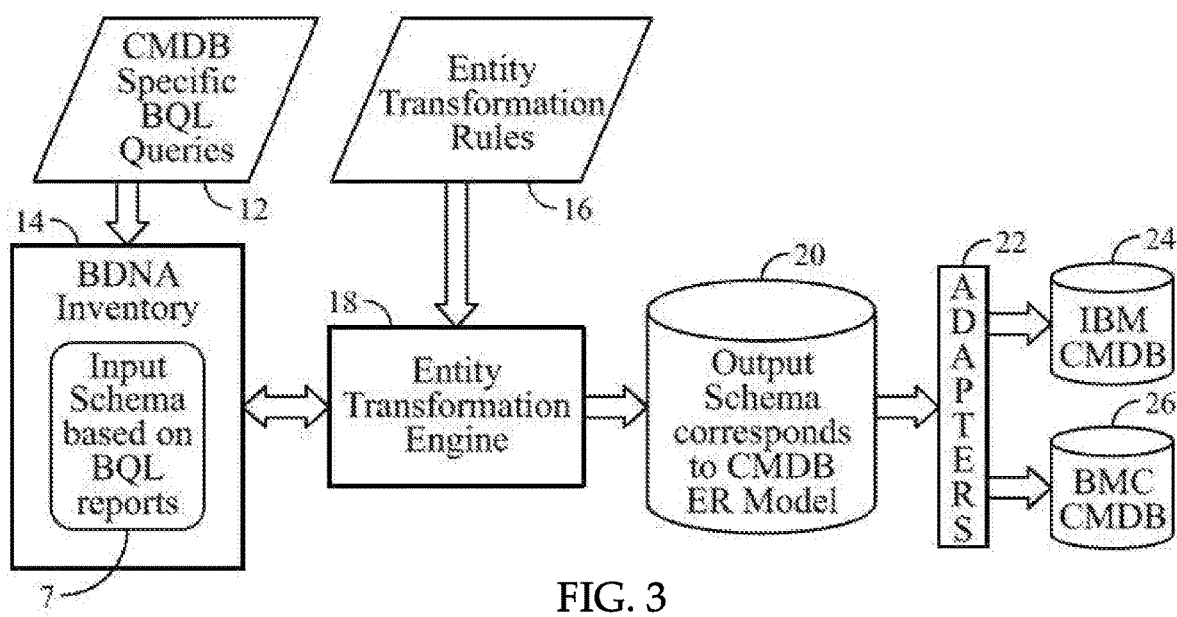
FIG. 3 is a block diagram showing the overall architecture of a system to transform inventory data gathered by an automated inventory attribute gathering system into data structures suitable for use in IBM CMDB and BMC CMDB systems.

FIG. 3 is a block diagram of the overall architecture of a system to convert data from a BDNA inventory data repository into records in database entries in the data format of IBM CMDB or BMC CMDB.

Block 12 represents a set of specific BQL queries which are specific to the project's source and target data models. The BQL reports are a set of reports necessary to transform m-to-n mapping of BDNA types into 1-to-n mapping of BQL reports. A BQL report is a database table where the main idea is to store all the required information for a CI in one table no matter how the attribute data was discovered. For example, at discovery time, discovery data may have been stored as several different elements. BQL reports contain data extracted from the BDNA inventory data to make up a complete specific CI in the CMDB data structure. An example of part of the All Operating System report (only five out of a large number of OS attributes are displayed) is given in the BQL report table below:

| OPERATINGSYSTEMS_id | OPERATING SYSTEM_LABEL | SERIAL NUMBER | TOTALMEMORY | VERSION |
|---|---|---|---|---|
| 102122068 | osiris.bdnacorp.com | B0ZJP81 | 294000640 | 5.2.3790 |
| 102122080 | qawin1.bdnacorp.com | 1MN3081 | 4294000640 | 5.2.3790 |
| 102122090 | hydra.bdnacorp.com | | 804757504 | 5.2.3790 |
| 102122096 | xseries3.bdnacorp.com | 00:14:5E:7E:2B:F2 | 4249919488 | Red Hat Enterprise 4 |
| 102122098 | xseries4.bdnacorp.com | 00:14:5E:7E:2B:EE | 4249899008 | Red Hat Enterprise 4 |
| 102122102 | titan.bdnacorp.com | 00:02:63:95:73:95 | 3189473280 | Red Hat Enterprise 4 |

-continued

| OPERATINGSYSTEMS_id | OPERATING SYSTEM_LABEL | SERIAL NUMBER | TOTALMEMORY | VERSION |
|---|---|---|---|---|
| 102122104 | avocado.bdnacorp.com | 00:14:22:09:30:E2 | 2124529664 | Red Hat Enterprise 4 |

An example of the Database Report for the Oracle database instance is included below.

| ORACLE INSTANCE_ID | ORACLE INSTANCE_LABEL | ORACLE INSTANCE_TYPE | NUM SESSIONS | EDITION | SCHEMA COUNT | OPERATING SYSTEM_ID |
|---|---|---|---|---|---|---|
| 102129509 | ora92 | Oracle Instance on UNIX | 2 | Standard | 39 | 102122173 |
| 102129483 | ora10g | Oracle Instance on UNIX | 21 | Enterprise | 28 | 102122146 |
| 102129472 | ora10g | Oracle Instance on UNIX | 10 | Standard | 9 | 102122144 |
| 102129461 | ora92 | Oracle Instance on UNIX | 26 | Standard | 9 | 102122136 |
| 102129444 | ora10g | Oracle Instance on UNIX | 32 | Enterprise | 9 | 102122134 |
| 102129433 | ora92 | Oracle Instance on UNIX | 1 | Standard | 5 | 102122132 |
| 102129416 | ora92 | Oracle Instance on UNIX | 1 | Standard | 4 | 102122130 |
| 102133888 | ORCL | Oracle Instance on Windows | | | 0 | 102123967 |

Note that all columns of the database report are related to database instances except for the last column Operating System ID that is the foreign key to the containing operating system (the column headings are too long to fit the page so they wrapped around).

These BQL Reports contain the data required to make up CIs of a specific CI type in the CMDB data structure.

Block 14 represents the data repository of automatically discovered inventory data regarding the attributes of the devices and software discovered in the discovery process. This data repository 14 is the source of the inventory data which is being transformed. Block 16 represents the entity transformation rules which are used to transform data entities from BDNA data format to CMDB format. The rules are vendor specific since each vendor has a different data schema (data structure). In other words, the transformation rules to transform BDNA data entities into CIs for IBM CMDB data structures will be different than transformation rules to transform BDNA data entities into BMC CMDB data structures. These rules would be different than transformation rules to transform IBM CMDB CIs into BDNA elements in the base tables created by the BDNA system.

All the mapping/transformation rules to transform attributes from the input schema to whatever is the output data schema are specified in block 16. There is one transformation rule for each CI type. Each transformation rule is handwritten by an analyst who understands the differences between the data structure of the CI in the target data model and the data structures of the elements and attribute data in the inventory data stored in the source system (which may be automatically discovered or stored in the source system base tables or data repository by hand). The transformation rules make the necessary data units conversion, data type conversion and semantic translation in the sense of placing the processed data in the appropriate field or fields of the target data model's data structure despite the fact that the data is called something else in the source data structure.

Block 18 represents the entity transformation engine. The entity transformation engine is a program running on a computer which receives all the input data from the inventory data repository in data format 1 (the BDNA inventory data or whatever other input data format is being used). That inventory data is transformed by the entity transformation engine using the entity transformation rules specified in block 16 as the other input. A specific example of a transformation rule process is given below.

Example of Transformation Rule

1) The discovery process assigns a value of device type to a Computer System to have a specific format (e.g., device.loadBalancer, device.storage etc.). Different CMDB vendors have different formats for storing such an attribute. Here is a snippet of a transformation rule that converts the value of this particular attribute.

```
<xsiTargetAttributeComputed name="csType">
    <xsiAttributeAlias name="deviceType"
sourceAttributeName="deviceType"/>
    <xsiCode>
        <![CDATA[
            if (deviceType.equals("device.loadBalancer"))
return "Load Balancer";
            else if (deviceType.equals("device.storage")) return
"StorageDevice";
```

```
    else if (deviceType.equals("device.system ")) return
"ComputerSystem";
    else if (deviceType.equals("device.storage.SAN.StorageArray"))
return "SAN Storage Device";
    else if (deviceType.equals("device.storage.SAN.StorageArray"))
return "SAN Storage Device";
    ...
    ]]>
    </xsiCode>
</xsiTargetAttributeComputed>
```

2) The discovery system finds the total physical memory of a Compute System in Bytes. The CMDB system requires the attribute values to be in Kilo Bytes. Here is a snippet of the transformation rule that does that conversion.

```
<xsiTargetAttributeComputed name="TotalPhysicalMemory">
    <xsiAttributeAlias name="memory"
sourceAttributeName="totalmemory"/>
    <xsiCode>
        <![CDATA[
        //bytes to kbytes
        if (memory == null) {
            return null;
        }
        return memory / 1024;
        ]]>
    </xsiCode>
    <xsiTargetAttributeComputer>
```

3) Simple name transformation: The discovery system calls an attribute representing the Operating System domain as oscomputerdomain but the CMDB system requires the attribute name to be WorkGroup. The following transformation rule snippet does the name conversion.

```
<xsiTargetAttributeMapped name="Workgroup"
    sourceAttributeName="oscomputerdomain"/>
```

4) The CMDB system requires an attribute called URI (Uniform Resource Identifier). For example the user directory/home/joe on the, machine joe.bdnacorp.com has a URI represented in the given format: file://ioe.bdnacorp.com//home/joe. The discovery process never computes the URI attribute. Instead a discovered element of type root.type.resource. software.OperatingSystern has the hostName attribute whereas a related discovered element of type root.types.resource.storageAllocation.fileSystem has a PhysicalName attribute with value/home/joe. The discovery process finds the elements with the corresponding values and also stores a relation between the two elements since they are related (by a containment relationship—since the filesystem element is contained in the OperatingSystem element), stores the relation information in the database. A BQL report is built to bring the two attributes (for each such discovered instance) together. Such a report may contain several other attributes such as fileSize, fileFormat etc.

A transformation rule to build the URI attribute takes the above two attributes (hostname and PlysicalName) as input and computes the URI attribute. The relevant snippet from a transformation rule that builds the URI attribute is as follows:

```
<xsiTargetAttributeComputed name="URI">
    <xsiAttributeAlias name="realFile"
sourceAttributeName="PhysicalName"/>
    <xsiAttributeAlias name="host" sourceAttributeName=
"hostName"/>
    <xsiCode>
    <![CDATA[
        return "file://"+host+"/"+realFile;
    ]]>
    </xsiCode>
    </xsiTargetAttributeComputed>
```

In the specific example of FIG. 3, the input data in BDNA data format is pulled from data repository 14 and the transformation rules specific to a BDNA to IBM CMDB data format transformation are applied to convert the input data into data in a CMDB ER Model which has data structures compatible with Configuration Items for the destination CMDB.

Block 20 represents the output schema Cls in the example given of the target data format being the CMDB ER Model or output data entities in whatever the target data format is. The ER model is a data model which is a staging area where the attribute data is temporarily stored which has been transformed by operation of the transformation rules engine to the data format required by the target data model. This temporarily stored data awaits export by the export adapter 56. FIG. 8A to FIG. 8H illustrate a block diagram of the data structure of the IBM ER Model. Each box in FIG. 8A to FIG. 8H is a table, and the list of attributes in the box is a listing of the names of the columns in the table. In other words, each attribute name listed in the box is the name of one column in the table having the name listed in the box. The IBM ER model is compatible with the data structure of the IBM CMDB data model so the data structure which implements the IBM CMDB data model would comprise tables for each CI type. Each table would have one column for each attribute and the rows in the column would be populated with the values of the attribute represented by the columns of attributes for instances of that type asset found in the BDNA inventory data base tables. For example, a particular laser printer may have only four attributes: manufacturer, model, serial number and IP address. The printer CI in the IBM CMDB would have subtype tables for different subtypes such as laser, inkjet, etc. In the data structure that stores the data of the IBM CMDB data model, the laser printer subtype table would have one row dedicated to the laser printed mentioned above. It would have four columns labelled manufacturer, model, serial number and IP address, and each column position on the row dedicated to the particular printer would be populated by the attribute value, e.g. HP, 801, HP2013458769, 10.10.10.1. Thus, the tables in FIG. 8A to FIG. 8H would basically be transferred to the data structure of the external system representing the IBM CMDB data model. Most of the instances would be recorded in tables for the subtypes, but any instance which could not be classified in one of the subtypes would be stored in a table for instances of the parent type Cl.

Figure 17:
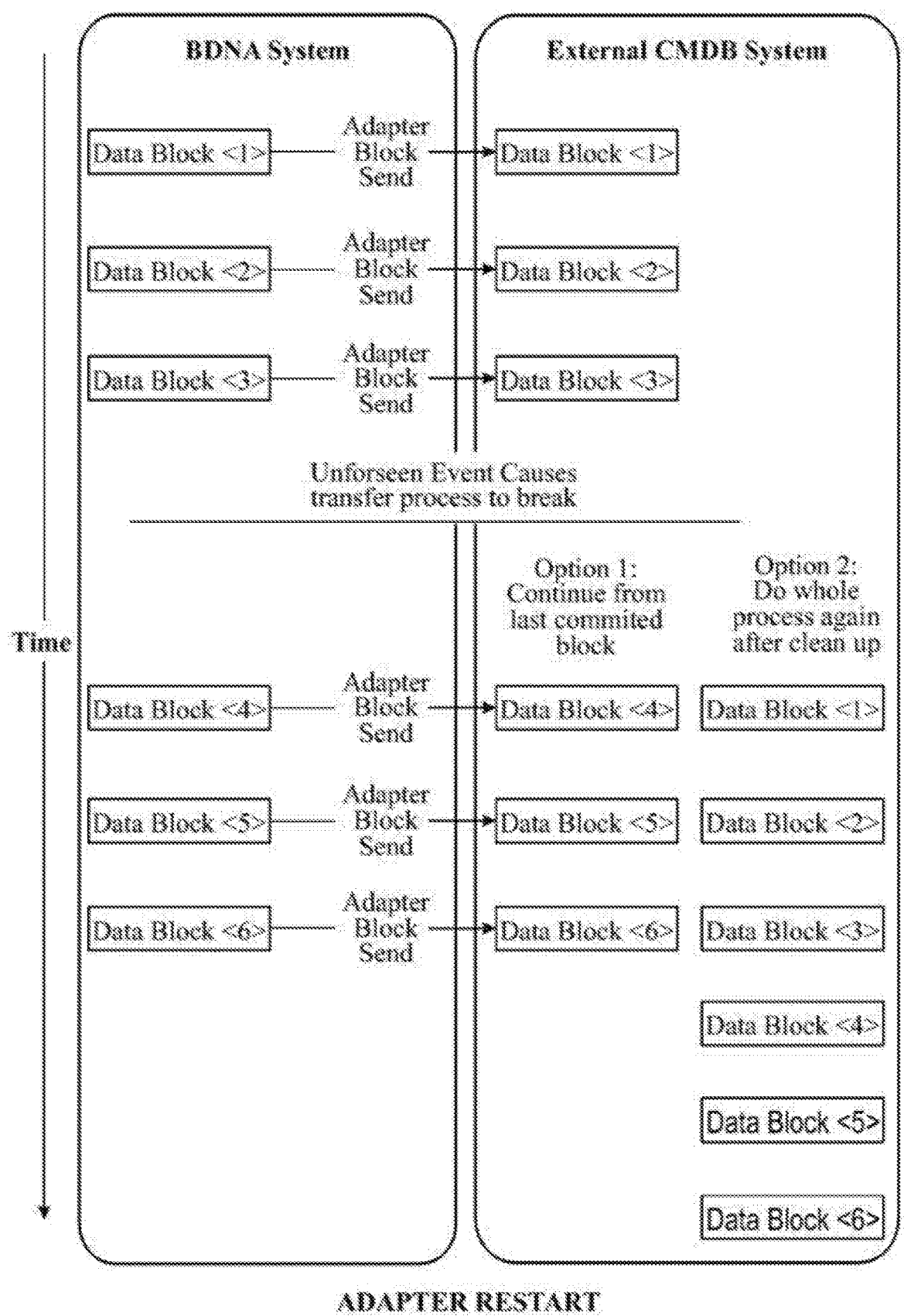
FIG. 17 is an example of the adapter restart.

Block 22 represents adapter interface mechanisms to process BDNA data in a well-defined, consistent, restartable and high performance manner. The adapter interface 22 performs the following functions:

1) defining BDNA data to be exported [I thought the data to be exported was defined by the BQL reports];

2) uniquely identifying entities and relations within a project;

3) providing a dynamic, pluggable interface for external adapters;

4) keeping track of the progress of the exporting process and allowing restarts; A restart is the process of partially redoing a transfer of information between BDNA and external CMDB. Restart might be necessary because doing the transfer can take a long time and the process might stop in the middle because of unforseen events such as the network or database failing or running out of disk space. In a restart case, the BDNA transformation engine allows the adapter to continue/restart from the last committed transaction instead of having to start the export process from the beginning all over again. FIG. 17 is an example of the adapter restart.

5) providing common mechanisms to log errors and warning conditions. Errors and warning conditions can occur during any step of the transformation. They can indicate a problem with the project definition, a problem with the BDNA data set exported, or that the transformation process encountered an out of resource condition. Examples of project definition problems: "Invalid rule definition", "rule reference missing rule definition" or "Invalid BQL report name". Examples of BDNA data set problems: "Foreign key constraint violation on relation installedOn". Examples of out of resource conditions: "Unable to reach BDNA database", "User tablespace full on BDNA database", "File system out of disk space while adapter output xml book".

6) divide up the data to be exported so that it can be processed in reasonable sizes.

The adapters 22 are software which drive Adapter Interface circuitry that is coupled to one or more data repositories 24 and 26 where the Configuration Items are stored. In this example, the CIs are stored in an IBM CMDB data schema and a BMC CMDB data schema. The mechanism to store data in an IBM CMDB is very different than the mechanism to store data in a BMC CMDB. Each of the IBM CMDB and the BMC CMDB will have its own adapter interface circuitry which is designed to follow the appropriate procedures to stored data in the target CMDB for which the adapter is designed. Basically, each export adapter is a driver for a specific CMDB which takes data tables out of the ER model for the target CMDB and invokes the proper procedures to store the data in the target CMDB in the appropriate place and the appropriate fashion. For example, for the IBM CMDB, the export data has to be put in XML book format and then exported. For a BMC CMDB, the export adapter is a JVC connector which connects the ER model to the data store where the BMC CMDB is being stored. The export adapter for each target CMDB knows the API for that target in that it knows what function calls to make and which arguments to supply for each function call.

Target data repositories 24 and 26 are databases in memory arrays which store the IBM and BMC format data structures. It is these data structures to which the ER model data is transferred by the export adapters.

Modes of Data Transfer

There are two modes of data transfer from the automated asset discovery systems to the CMDB data structures.

1. Stateless Transfer: this type transfer assumes all the data collected by the automated asset discovery system is assumed to be new. The result is that the system attempts to create every CI defined by the IBM CMDB. Stateless vs. State Based transfers deals with what happens when information about the same CI is added to or removed from the CMDB but with different data collected multiple times. A stateless transfer from BDNA to CMDB means only insert operations are done into the target CMDB without trying to find out if that particular CI already exists. A state based transfer requires the BDNA adapter to query the target CMDB to find affected CIs and either do an insert, update, or delete depending on the state of the remote CI. It is up to the CMDB Reconciliation Engine to resolve for each CI the system attempts to create if the CI already exists in the CMDB (based upon the NamingRules). A reconciliation engine is part of the target CMDB. It uses unique naming rules on the CMDB system to keep unique copies of each CI. Naming rules are mechanisms for unique identifying of CIs. A computer system might be identified by a combination of its domain name "foo.bdnacorp.com", and its active IP addresses: {192.168.1.160, 10.10.10.1). They are used when trying to find if a particular CI already exists in the target CMDB system when doing state based transfers. This is approach can be implemented without having a CMDB Driver component.

Figure 18:
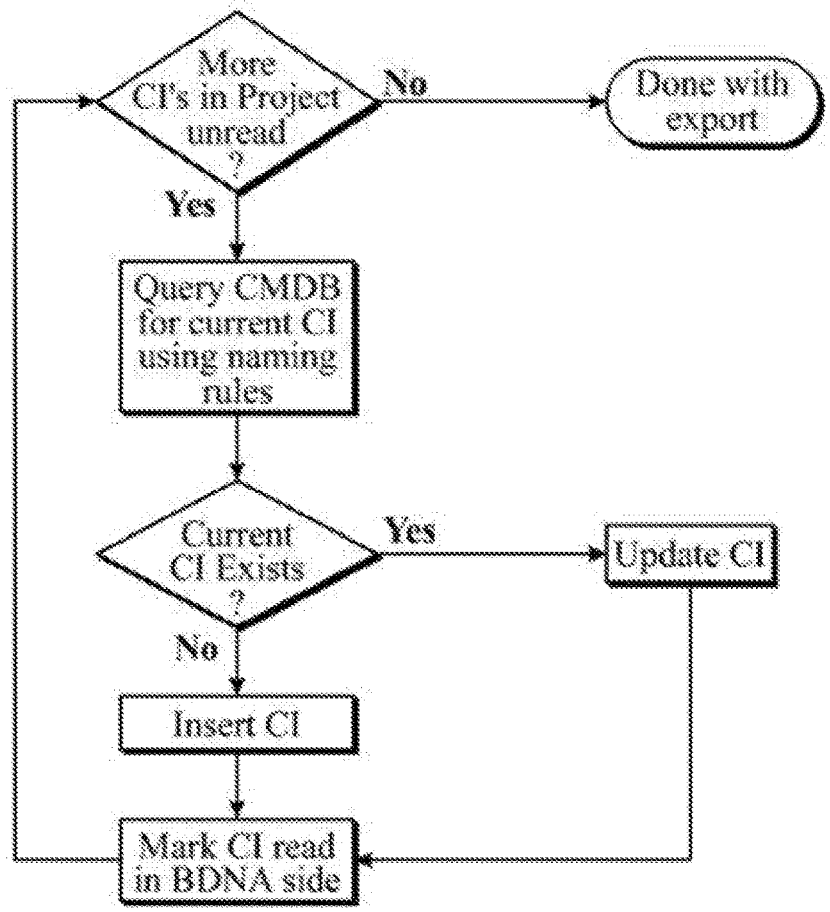
FIG. 18 is a flow diagram of a BDNA adapter doing a state-based transfer.

2. State Based Transfer: in this type of transfer, data that was previously exported is cached. The cached data is used to compute the differences (the delta) between the cached data and the new data. Based upon these differences, instructions are generated such as create, modify, delete, etc. Assuming most of the data does not change, the time to process the differences will be small. A CMDB driver implements the state based transfer. FIG. 18 is a flow diagram of a BDNA adapter doing a state-based transfer. State based transfers are more complicated because it must match BDNA data with state of target CMDB.

FIG. 3 is a diagram of the schema or data structure needed to do the type of transformations which the system of FIG. 2 performs. The XSI_Project table 30 is a table which contains definitions of a project object specifying rules reference, input entities references, output entities references, relations between output references, and adapter configuration. The adapter configuration is any specific information required by the adapter to run. For example, a specific Vendor's adapter may need specific connection properties or some such detail to run. Such vendor specific adapter details are provided as adapter configuration.

Xsi_xform_rule_ref 32 is a table containing definition of transformation rule references used by the project. Each row of this table identifies a single transformation rule. Rules can operate on CI's or relationships between CI's Both CI's or relations have unique entity ID's. Each rule identifies its entity source and entity target. An xsi_entity_source or sxi_entity_target is the unique ID associated with either a relation or CI.

Xsi_adapter 34 is a table which defines the output adapter and its associated entity and relation outputs. The xsi_adapter and xsi_adapter_output tables define information used by the transformation engine to configure, find the subset of the model used by the adapter, and run the adapter when a user requests a transformation. Each project can define an adapter in the xsi_adapter table with information to load the adapter and which configuration it should use for this particular project. The xsi_adapter_output table defines which CI's and relations are part of this project and should be sent to the adapter when the transformation is executed. These references are needed because projects can share entities and relations. For example, the BMC adapter project has CI tables: T1, T2, T3, and the IBM adapter project has CI tables T2, T3, T4.

In this example the BDNA External tables would create T1, T2, T3, T4, but the BMC adapter would only use the first three tables while IBM's adapter would only output the last three. Given a particular table representing a CI, not all of its columns need to be exported to the target CMDB. Some of the invisible columns might only be used while processing the transformation rules and are not used when exporting to the target CMDB.

Xsi_adapter_output 36 is a table which contains information about the set of entity and relations output to be read by the adapter.

Xsi_base_type_ref 38 is a table which defines identities, entities and relations used by a project. An entity is a table that is part of ER model defined and built with BQL. Each defined CI and the defined relationships between CI's form a CMDB specific ER Model. The BDNA transformation engine represents each CI as a table with a unique ID for each CI instance, and a column corresponding to each CI's attribute. Relations betweens CI's are also implemented as a table with two columns sourceId, targetId. This generic implementation of the ER Model can be reused for multiple CMDB specific ER Models. It loosely corresponds to a particular type in the ER model. A relation associates two families of type: a source type and a target type. We only need to define a relation between base types, and it also applies to all subtypes of each CI. For example the relation "OperatingSystem runningOn ComputerSystem" is the only one needed to accommodate the instances "Windows1 runningOn CS1", "Linux2 runningOn CS2", "Solaris3 runningOn CS3".

Figure 19:
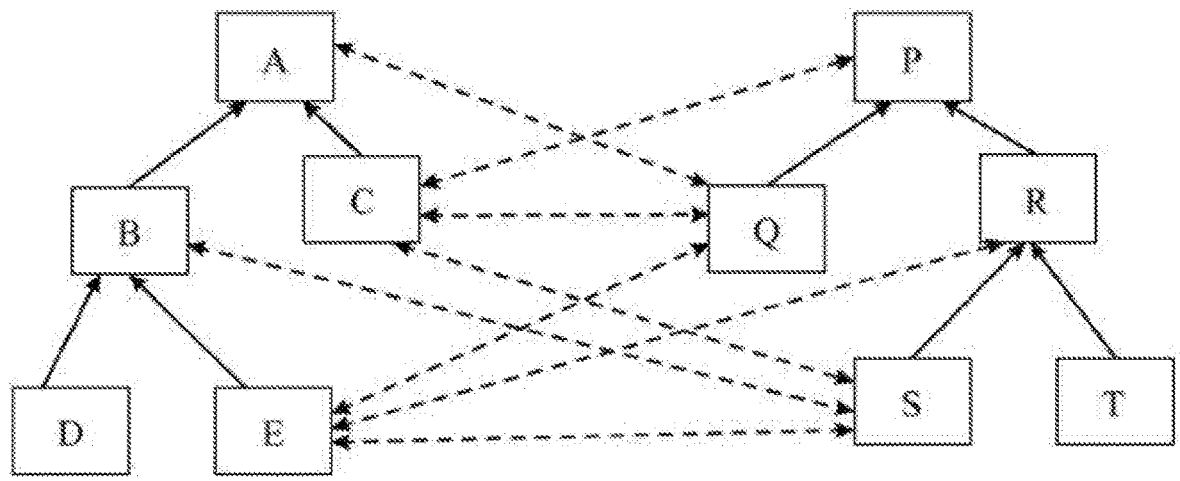
FIG. 19 shows two hierarchies of objects, one rooted at A and one rooted at P.

The need for Identity table results from the fact that the output data model that we what to populate is Object Oriented. The ability to have several subtypes of a base type requires us to store the subtype data separate from each other. But consider two such hierarchies shown in FIG. 19. FIG. 19 shows two hierarchies of objects, one rooted at A and one rooted at P. Trying to specify relations between objects of hierarchy rooted at A with objects of hierarchy rooted at P becomes difficult because one has to consider all possible combinations of relations. As a result, we store the identities of all objects belonging to every subtype rooted at A in one Identity table and similarly the identities of all objects belonging to every subtype rooted at P in another Identity table. The relations between the two sets of objects refer to the Identity tables instead of the tables storing the actual data. This is one of the important reasons for using the Identity tables. Besides these tables get used to keeping track of objects as they are output to the CMDB using the adapters (to remember which one's have been already processed).

Identity objects are project specific tables created to identify types and all associated subtypes for each type. A type is a CI definition, for example Operating System. A subtype is Unix. Another subtype is Windows. For example: OperatingSystem-Unix-Linux would specify a particular subtype. Each relation must associate its source and target with identity tables. The identity tables are used when outputting the ER Model for: identity mapping; final type instantiation; and, keeping track of identity read state. In the ER Model, the identity of each CI instance is separated from its attribute values in one embodiment. Identity tables are used to uniquely identify each CI instance and to keep state for the CI instance in the project (for example, whether a project adapter has exported a CI instance to its CMDB). Identity tables have a fixed format that ER Modelers must obey when creating them.

The above defined schema permits modeling a full-fledged object model which includes entities (an identity/entity pair) and relations between entities (an association between two entities identified by an entity source ID and an entity target ID.

Figure 4:
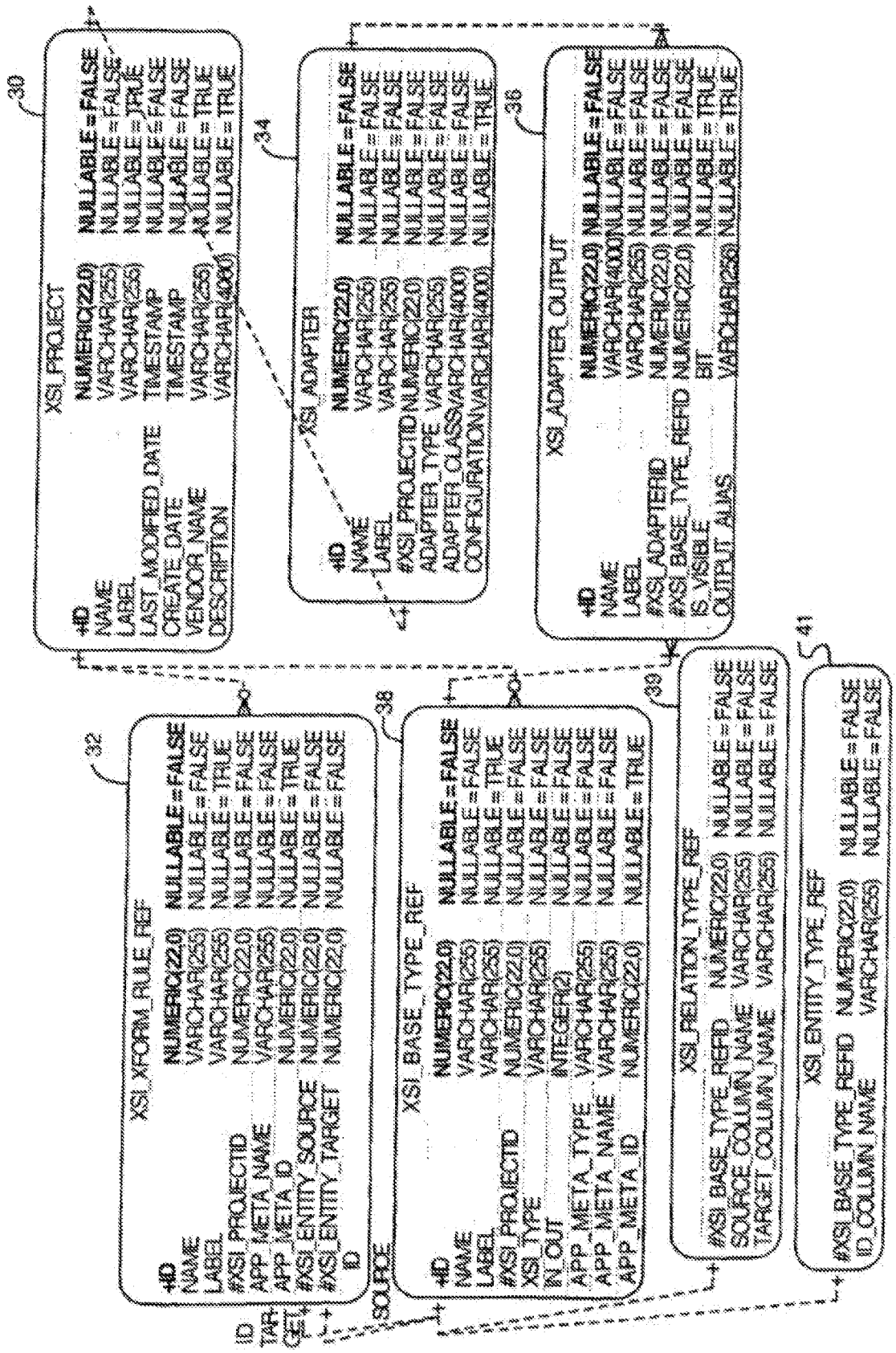
FIG. 4 is a diagram of the schema or data structure needed to do the type of transformations which the system of FIG. 3 performs.

FIG. 4 illustrates a data structure of how the transformation rules are internally stored. It is a diagram of a supported object model comprising ER Model Table Types. The transformation process involves a BQL report or reports, transformation rules and an output table. Somewhere the BQL report definition, transformation rule definition and output table definition. Those definitions have to be stored somewhere, and FIG. 4 represents one embodiment of a data structure to store these definitions and other data needed for each transformation project. Table 38 stores all the definitions for the BQL report, transformation rules and output table.

Table 30 identifies each project and groups all the definitions and transformation rules for that project together. The transformation rules for each project are stored in table 38. In fact, table 38 stores all the rules for all the projects as well as all entities and all relations between CI types for all projects. Which relations exist for each project are indicated in table 39. The entities which exist for each project are listed in table 41. Table 32 contains information which indicates which transformation rules are used for each project. In other words, table 38 stores the relationship information (such as the "installed on" relationship) between CI classes illustrated in FIG. 1A to FIG. 1C as lines between the CI type boxes for all projects, and table 39 indicates which relations are used on each project. Table 34 stores the information needed for the export adapters. For example, table 34 stores information about which code the export adapter for each project needs to run, which classes need to be run, what tables are involved when the export adapter is run. Table 36 stores information on which attributes are actually needed for each CI in case more attribute data has been collected than is needed for a particular CI.

Table 30 stores identity objects in the models which are used to keep track of a unique project per entity and whether the entity has been read by the adapter during output. Each identity has a corresponding entity associated with it. Entities represent the actual inventory attribute information to be exported which was collected by the automated inventory attribute discovery system such as the BDNA software. The types of entities associated with identities can have different types. For example, a ComputerSystemIdentity can be associated with entities of different types ComputerSystemWindows, ComputerSystemLinux, ComputerSystemSolaris, etc. The possible subtypes associated with an identity are defined in the xsi_entity_type_ref object table 42. The adapter interface API uses the project data to validate and enforce constraints when processing a project.

Relation objects define a directed association between two identities and their specific subtypes in a project. Each xsi_relation_type_ref that is part of a project defines a 'dependency' attribute which can be one of: sourceItargetImutuallnone. The information is used by the adapter to validated relations between CI's. For example, the relation: "OperatingSystem runsOn ComputerSystem" should be defined with dependency='mutual'. This allows the adapter framework to check to make sure that all operatingSystem CI's have a relation to some computerSystem. This checking would be validation of a constraint, e.g., each operating system must be installed on a computer system. For example, the relation "installedOn" would exist between identities ComputerSystemIdentity and OperatingSystemIdentity. An actual instance example might be: source is scId(1)/WinCS(1) is associated with target osId(2)/WinOs (2). Like identities, relations have a unique project identifier and read flag state which are used to track what objects are left to be read in a project A project is essentially one conversion at one time of BDNA inventory data to IBM data. Essentially, a project is the definition of how to convert from BDNA to CMDB models and the current state of the conversion. You can load the project, start, or restart the conversion. But you can only have one active conversion at a time per project.

Another attribute defined per relation type is "dependency". As mentioned above, a relation type can take the values source, target, mutual or none, and it is used to enforce constraints between the relation and its entities. In the case of the "installedOn" relation, the dependency is defined as "source" which means that there should be no Operating System entity that is not installed on a computer system. Example, "WinXP installedOn ComputerAbe2". WinXP is the source, ComputerAbe2 is the target. To BDNA this means during discovery we found that ComputerAbe2 has Windows XP installed on it. Part of the validation we do while processing the model makes sure that every OperatingSystem also has a relation to a computer system since BDNA cannot discover uninstalledi operating systems. On the CMDB side, you could have many OperatingSystem disks sitting in a warehouse and not installed in any computer system. The adapter interface will flag entities in the model that break the dependency constraint and each adapter using the interface can use the information to log problems or report errors.

Figure 5:
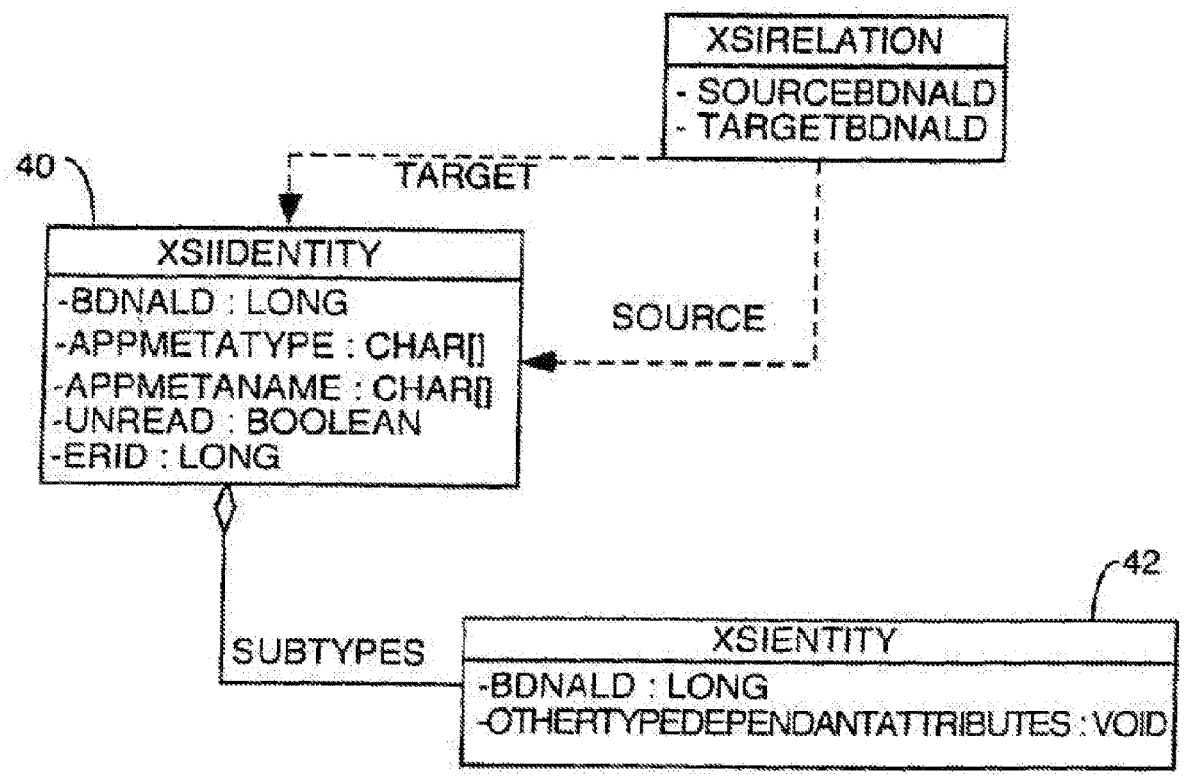
FIG. 5 is a diagram of a supported object model comprising ER Model Table Types.

FIG. 5 represents a typical CMDB extraction configuration. After loading a project, the first steps are to issue a command to take the current BDNA data, transform it into the project specific CMDB ER Model, and then run the adapter or other tools to send it to its CMDB system. These are the steps performed during an extraction. BDNA defined the BQL language for defining extraction projects. The transformation engine can load projects defined in that language and execute the steps above to run the project.

Figure 20:
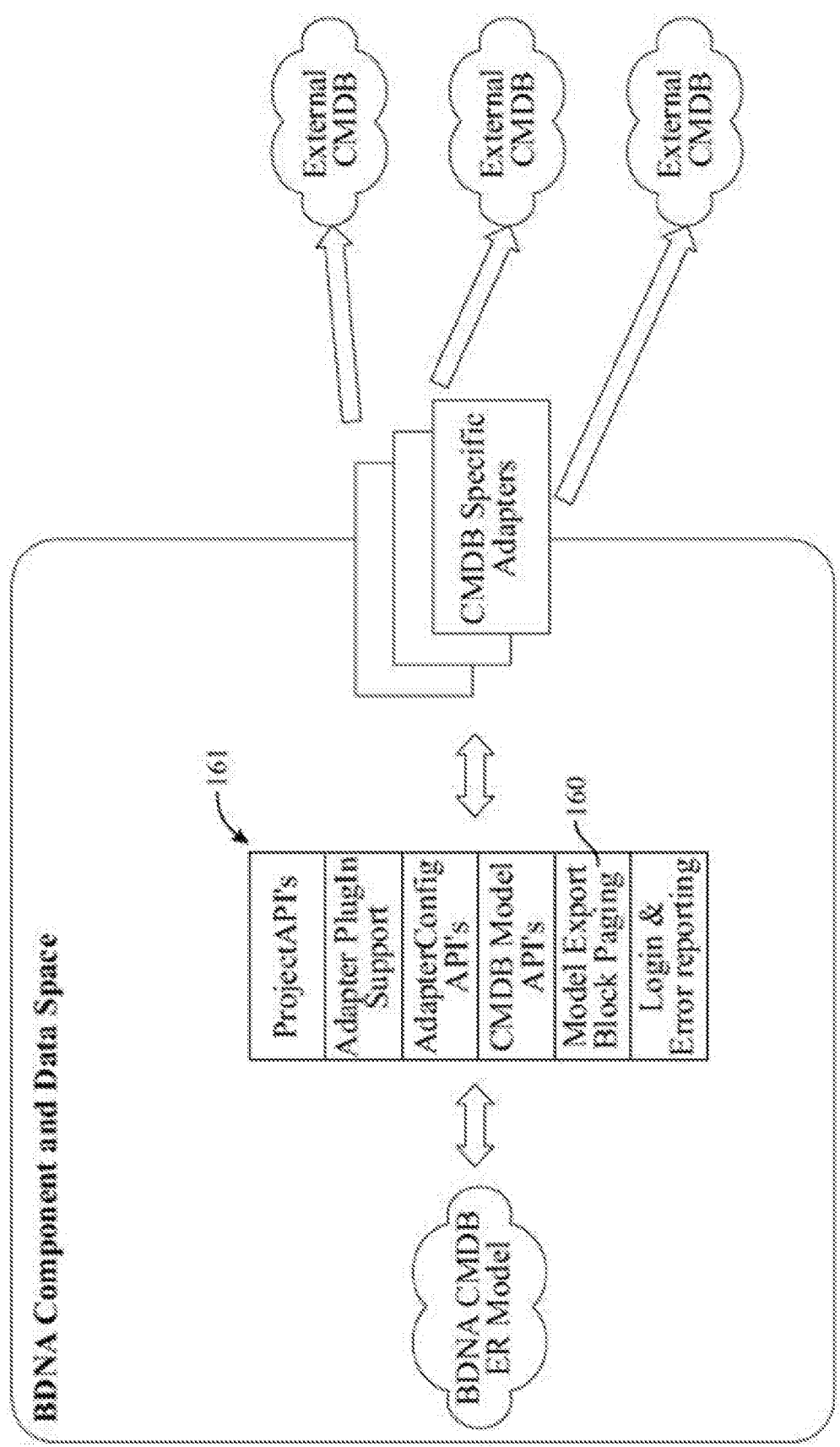
FIG. 20 represents the process of exporting the data from the BDNA CMDB ER Model using the CMDB specific adapters to external CMDB stores.

Block 44 represents a CMDB project having one or more BQL reports that define the data that must be extracted from the BDNA inventory data for each CI to be generated. Block 44 also contains the transform rules and the export adapter configuration file. Adapter configuration is used to control the process of exporting from BDNA to a CMDB system. FIG. 20 represents the process of exporting the data from the BDNA CMDB ER Model using the CMDB specific adapters to external CMDB stores. The Model Export Block Paging block 160 represents a process to break the export process up into manageable size blocks while keeping all related data together. Each configuration is specific to the adapter and its external CMDB system. In the case of IBM's CMDB adapter you can configure: location of CMDB books generated and how big is each CMDB book for example.

The BDNA transformation framework 161 in FIG. 20 provides support for: Plug-in different adapters based on the type of CMDB export, querying export project definition, defining what part of the CMDB Model is exportable and visible, and maintaining the state of the export process, a consistent block based API to allow dividing the export process into manageable block sizes (the process represented by block 160 in FIG. 20).

Figure 6:
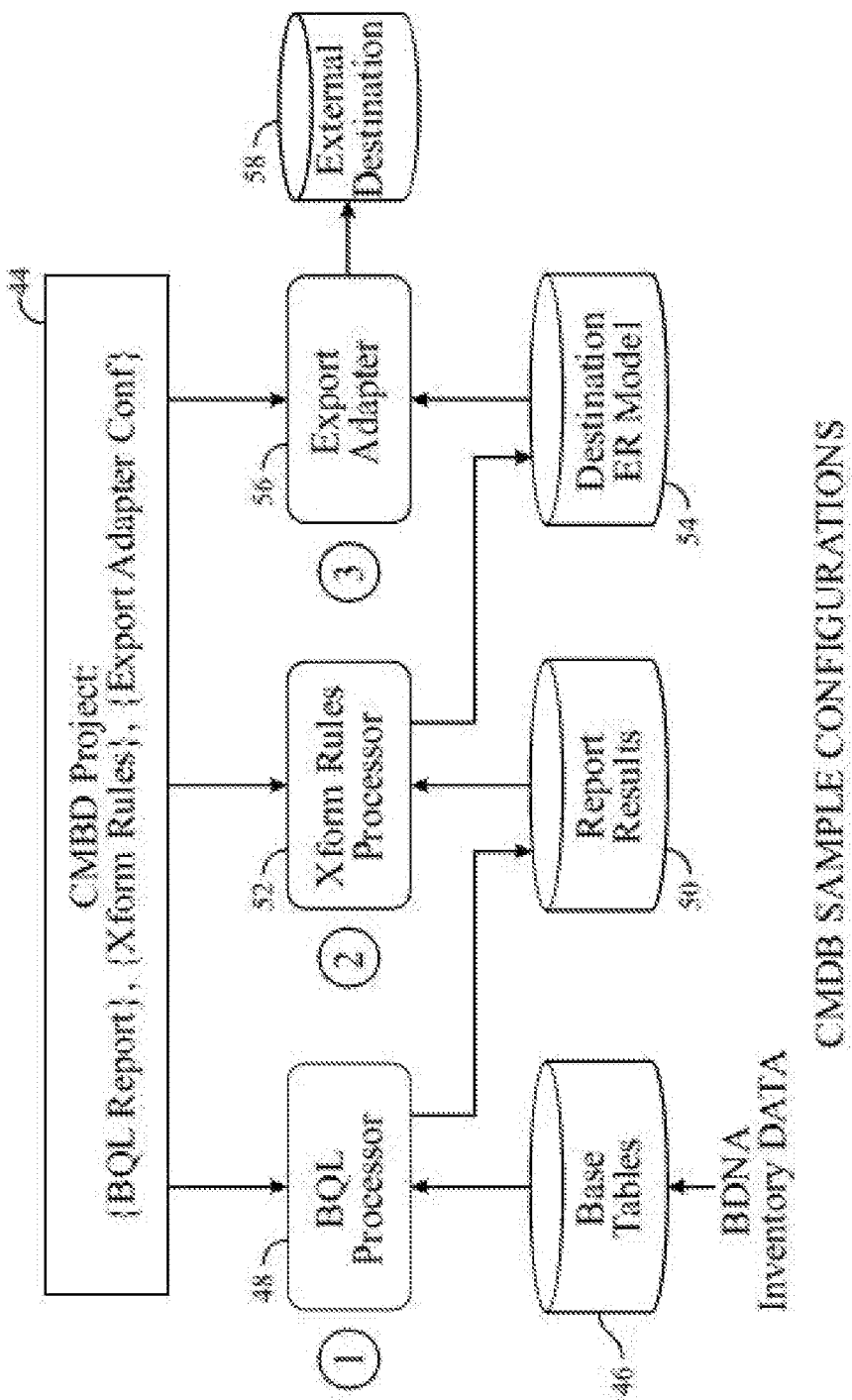
FIG. 6 is a diagram illustrating the hardware and data flows of a system to transform BDNA asset attribute data into a destination ER model and export the transformed attribute data into an external system data store such as IBM CMDB.

Block 44 in FIG. 6 represents all the information associated with a CMDB project. Before the project is loaded the information is in XML form. When the project is running the information is in memory.

The inventory attribute data that was automatically discovered by the automated inventory system, such as the BDNA software, is represented by block 46. Block 46 represents data structures in memory that embody the base tables the BDNA software generates in its persistent data warehouse. The base table has an entry for every hardware and software asset discovered and all the attributes about each asset that have been discovered during the automated inventory process.

Step 1: BQL Process (block 48) reads BQL Reports (subset of block 44) and uses existing BDNA data (block 46 Base Table) to produce CMDB Report Results (block 50). The reports contain the attributes needed for each CI.

Step 2: Xform Rules Processor (block 52) reads Xform rules (subset of block 44) and processes each rule against CMDB Reports Results (block 50) to produce Destination ER Model (block 54). The transform rules processor is a computer programmed to execute transform rules to convert the data format of data in the reports to the format of data in a destination ER model data structure 54. The destination ER model contains the data structures required by CMDB. The transform rules processor also generates defined relations in the CMDB ER model.

Step 3: Export adapter (block 56) reads Export Adapter Configuration (subset of block 44) and Destination ER Model (block 54) to export to External Destination (block 58).

Mapping and Transformation Process Details

Figure 7:
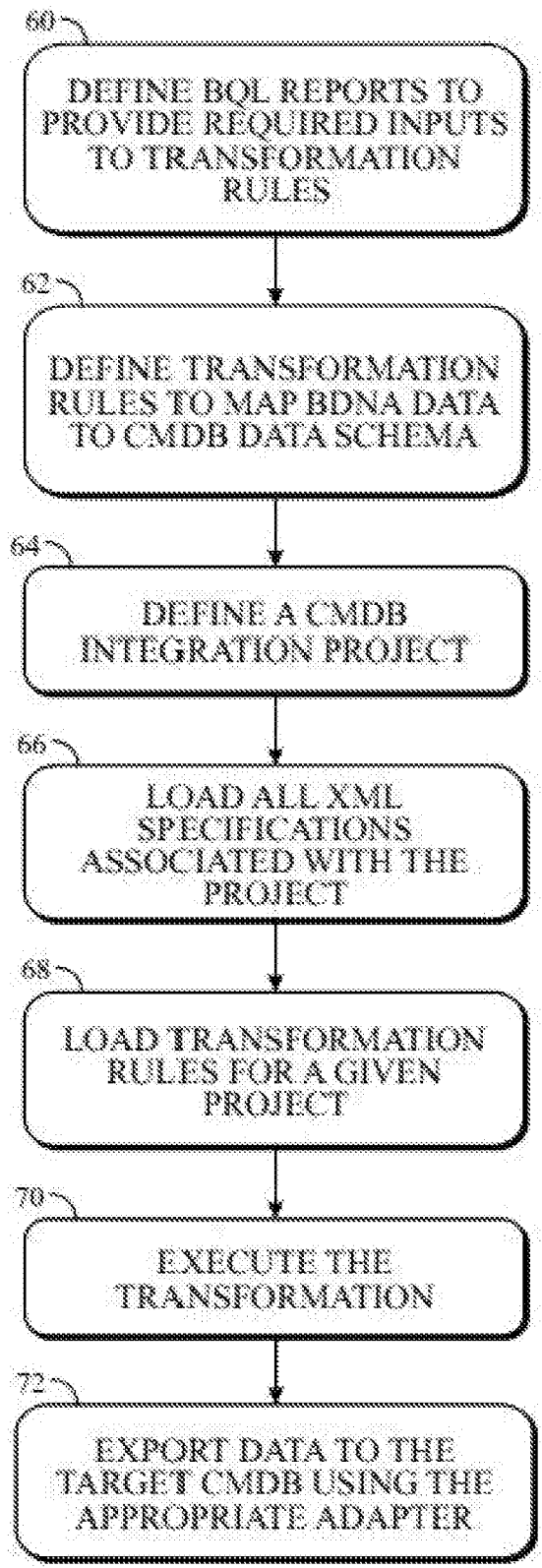
FIG. 7 is a flow diagram of the workflow of a process to create the BQL reports and transformation rules for a specific transformation project and use them to transform BDNA inventory asset attribute data into CIs in the data model of a CMDB data structure.
Figure 8B:
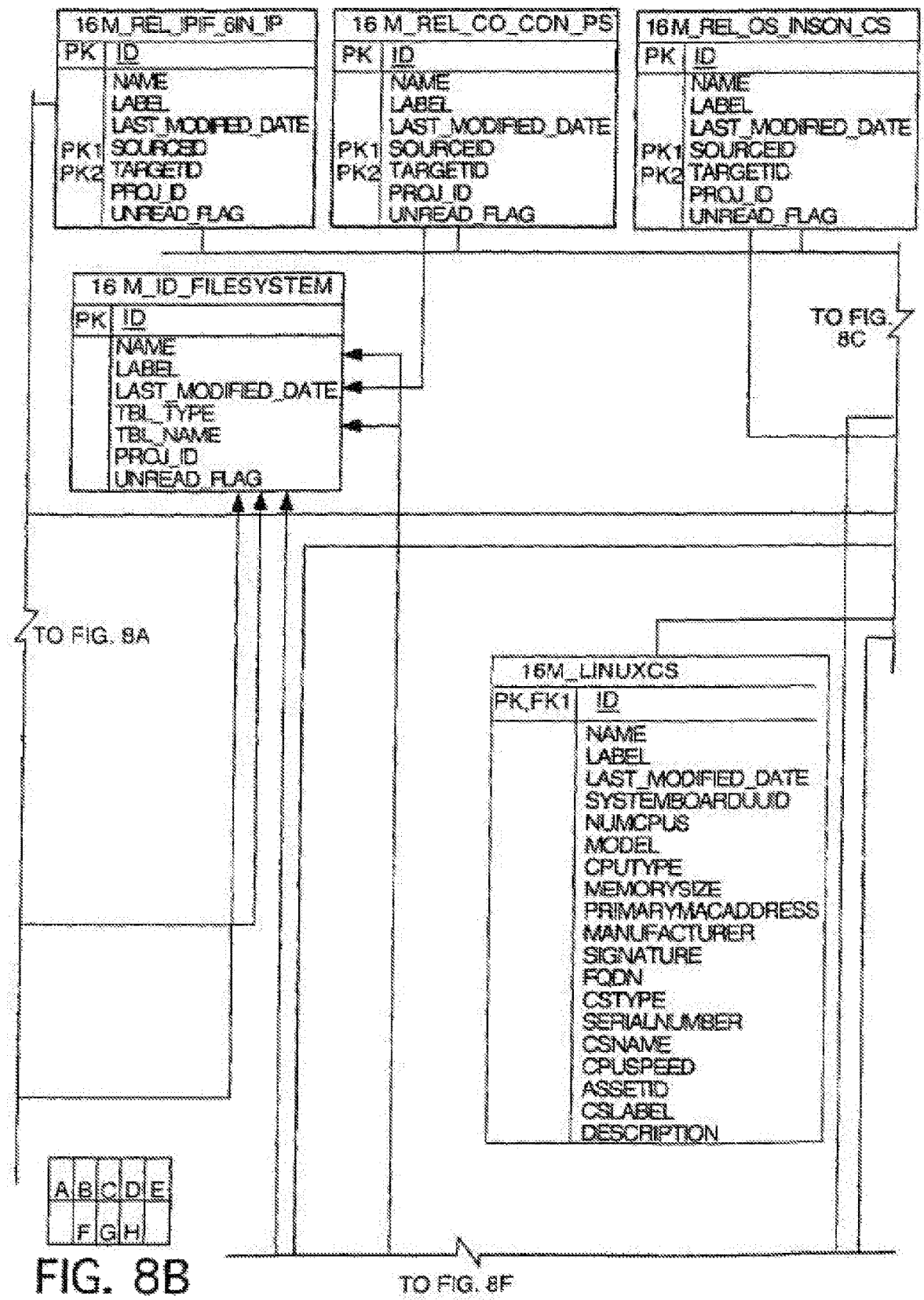
Figure 8C:
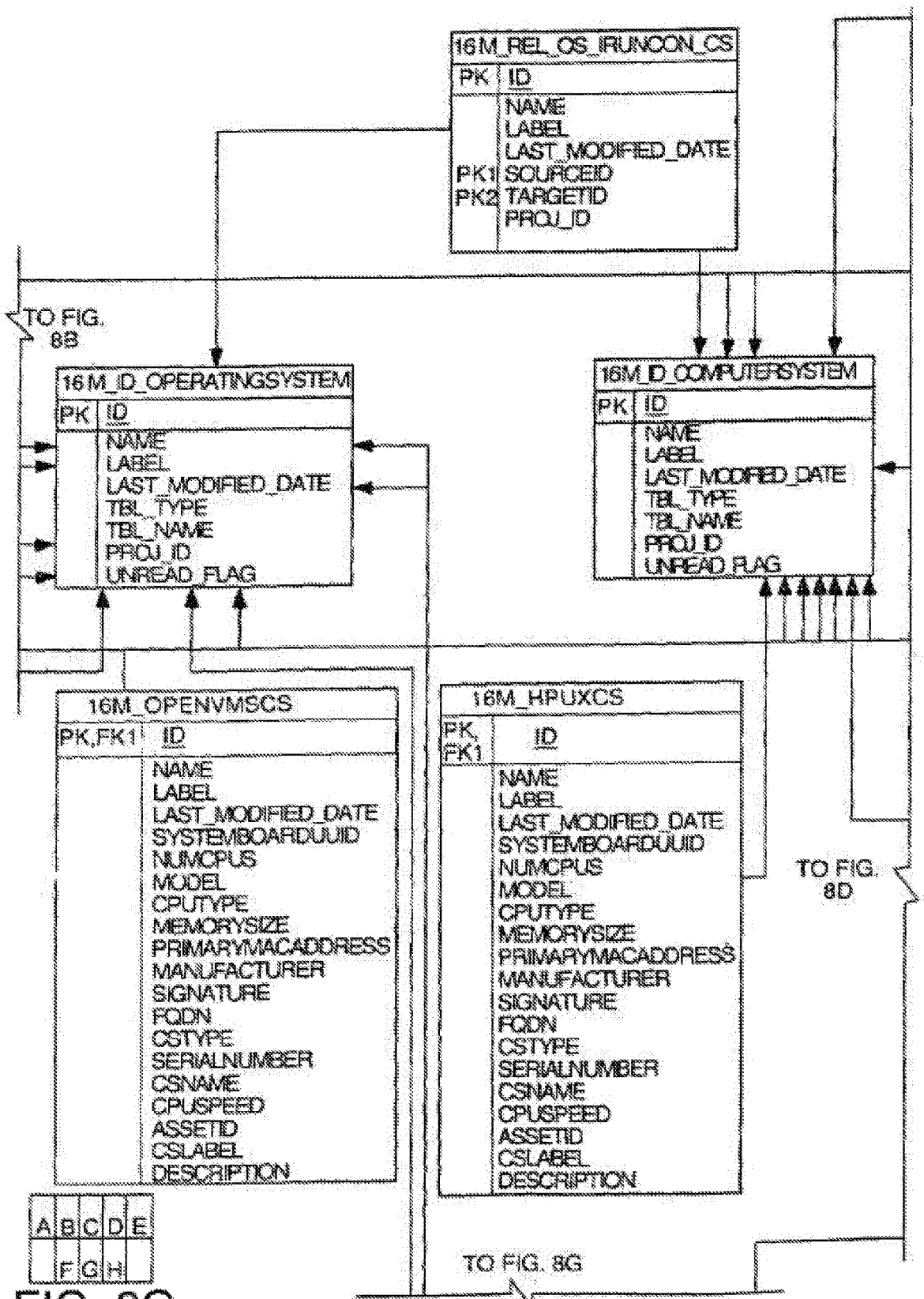
Figure 8D:
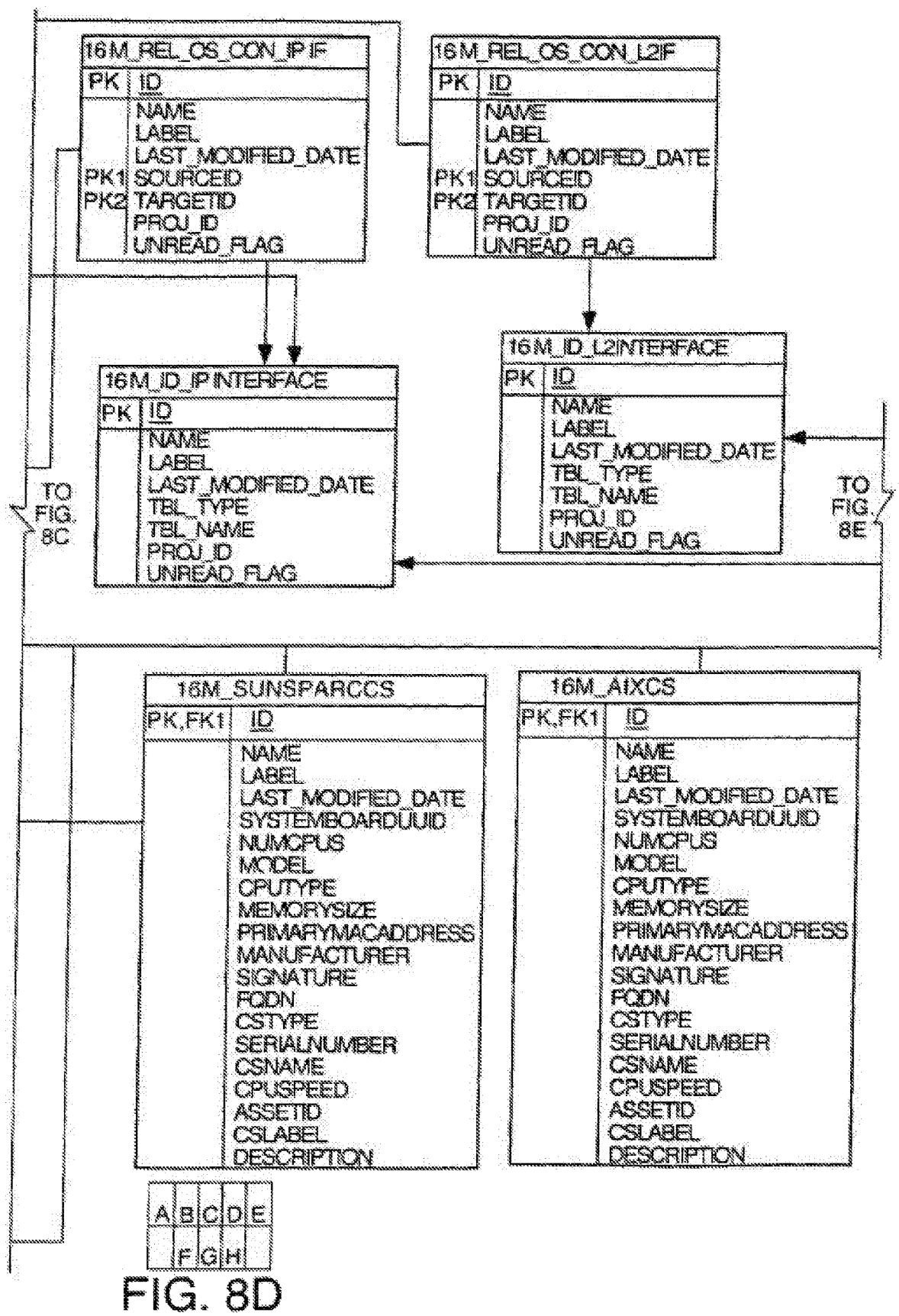
Figure 8E:
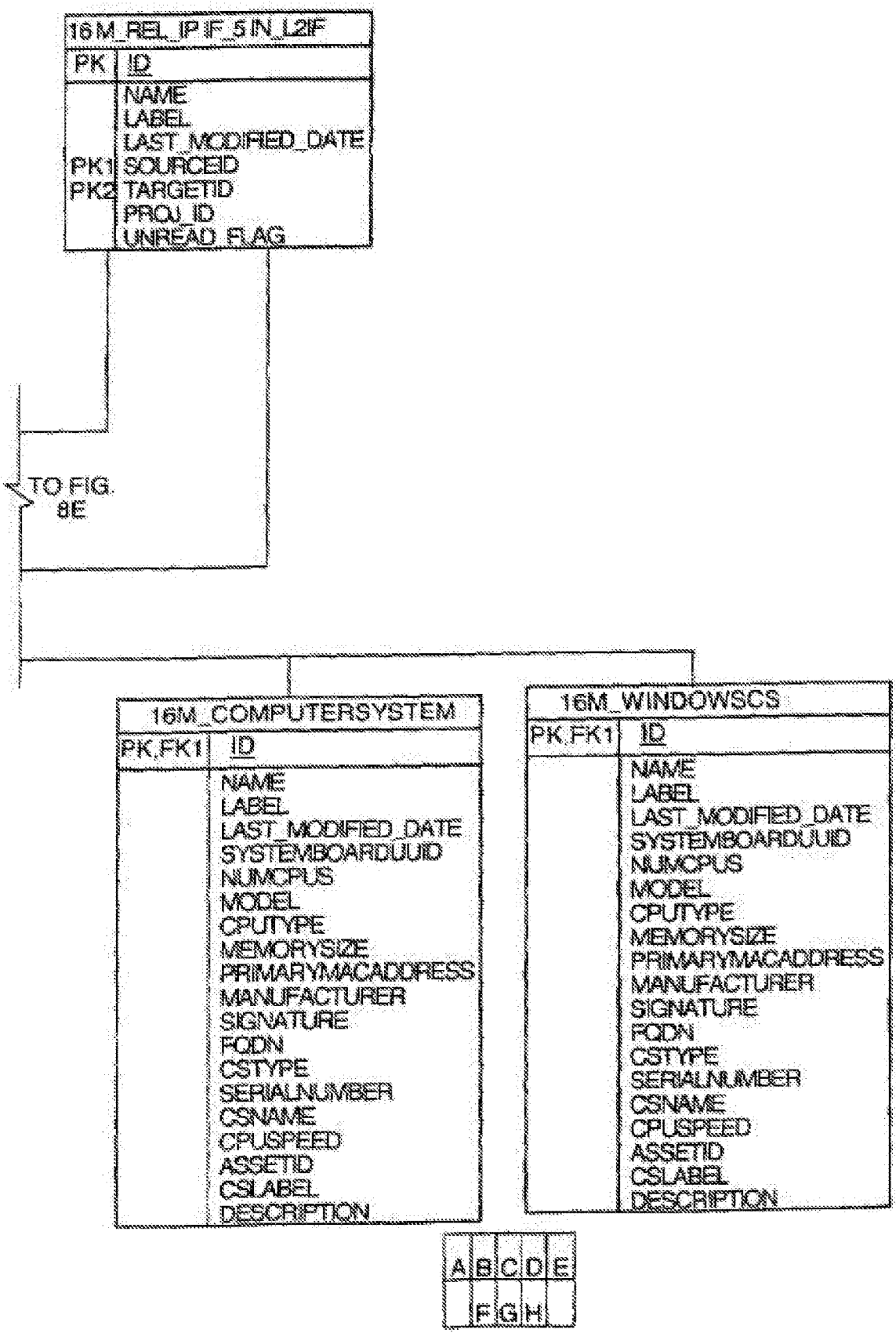
Figure 8G:
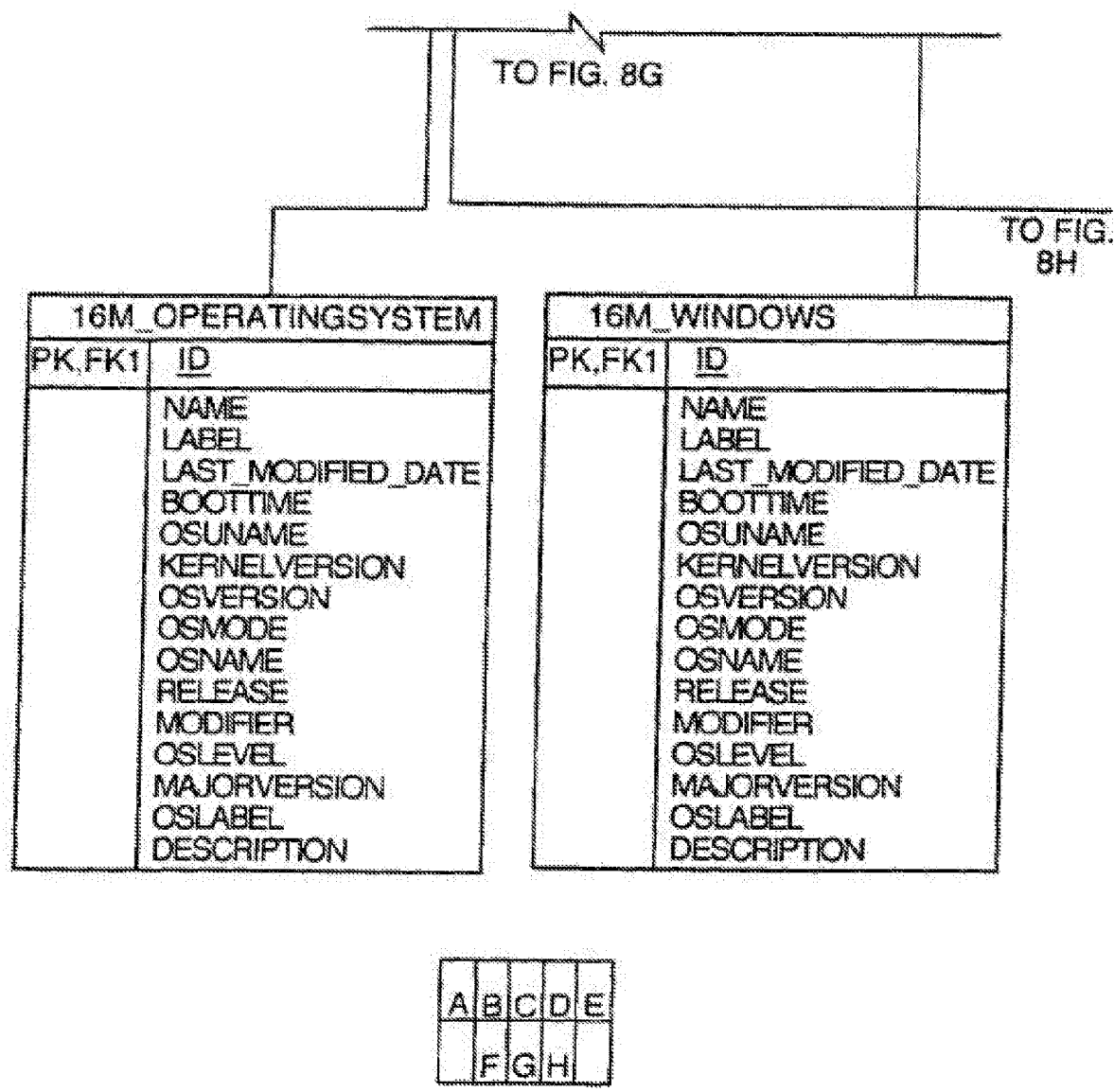
Figure 13:
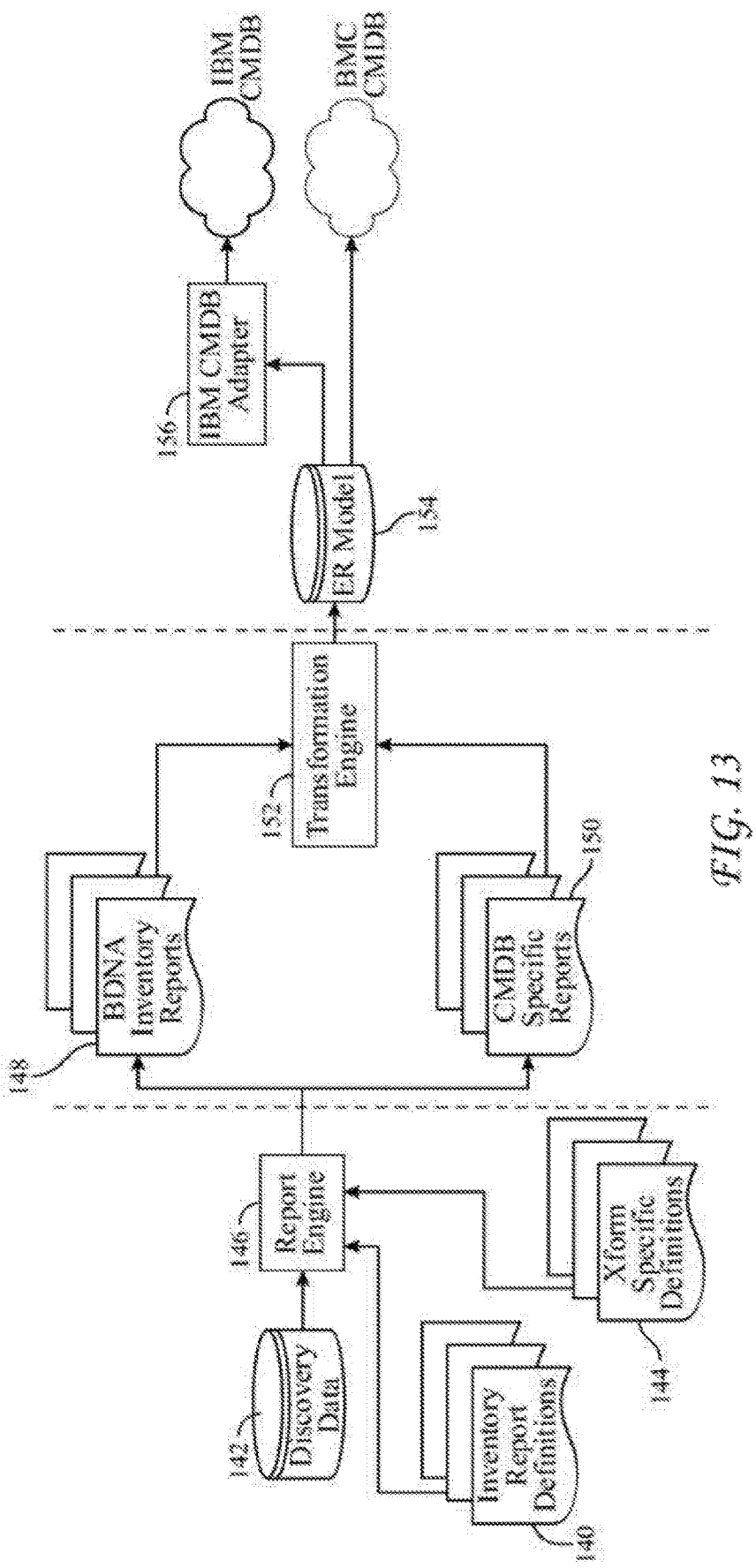
FIG. 13 is an illustration of the overall workflow of another embodiment of a transformation process represented by the flowchart of FIG. 7.

FIG. 7 is a flowchart of the flow of steps of a genus of processes that can be performed to map BDNA inventory attribute data to CMDB format data. FIG. 13 is a graphical diagram of the workflow of one species of process represented by FIG. 7. Step 60 represents a process where a content writer for the schema mapping defines BQL Reports that define the required attribute input data to the transformation process where transformation rules are used to convert the BDNA data into CMDB entity types. Reports are defined for: 1) collecting the attributes required for the various entities in the CMDB data model; and 2) specifying the relationship between entities. In FIG. 13, the inventory report definitions are represented by blocks 140. These reports define which inventory data in the attribute data 142 which is needed to make up the CI types of the target system. Block 144 represents the BQL reports which are transform specific definitions. Inventory reports 140 are used to process Discovery Data into report tables used by the BDNA Inventory UI applications. Xform specific report definitions (BQL reports) 144 are used to reorganize the BDNA discovery data (142) into the CI's matching the target CMDB ER model and create appropriate CMDB specific report tables. The two are different and exist independently of each other. The purpose of the Inventory reports is to provide information for the BDNA Inventory UI as efficiently as possible and therefore it is highly de-normalized data. The purpose of Xform specific reports (BQL reports) and tables is to match the required CMDB ER model for each CI and their relations. The Xform specific reports and tables are highly normalized and closely match the target CMDB schema. The CMDB transform specific definitions 144 are needed to: group data in ways not normally required by BDNA automated inventory attribute data collection systems; synthesize data required by the target CMDB system which is not collected by the BDNA automated inventory attribute data collection system, and define ER model relationships not required by the BDNA automated inventory attributed data collection source system.

The BQL reports are executed by a report engine 146 which uses the definitions in the reports to extract the attribute data specified in the BQL reports from the discovery attribute data stored in store 142 by the BDNA inventory system. The report engine stores the extracted attribute data in the BDNA inventory reports and the CMDB specific reports 150.

Figure 12:
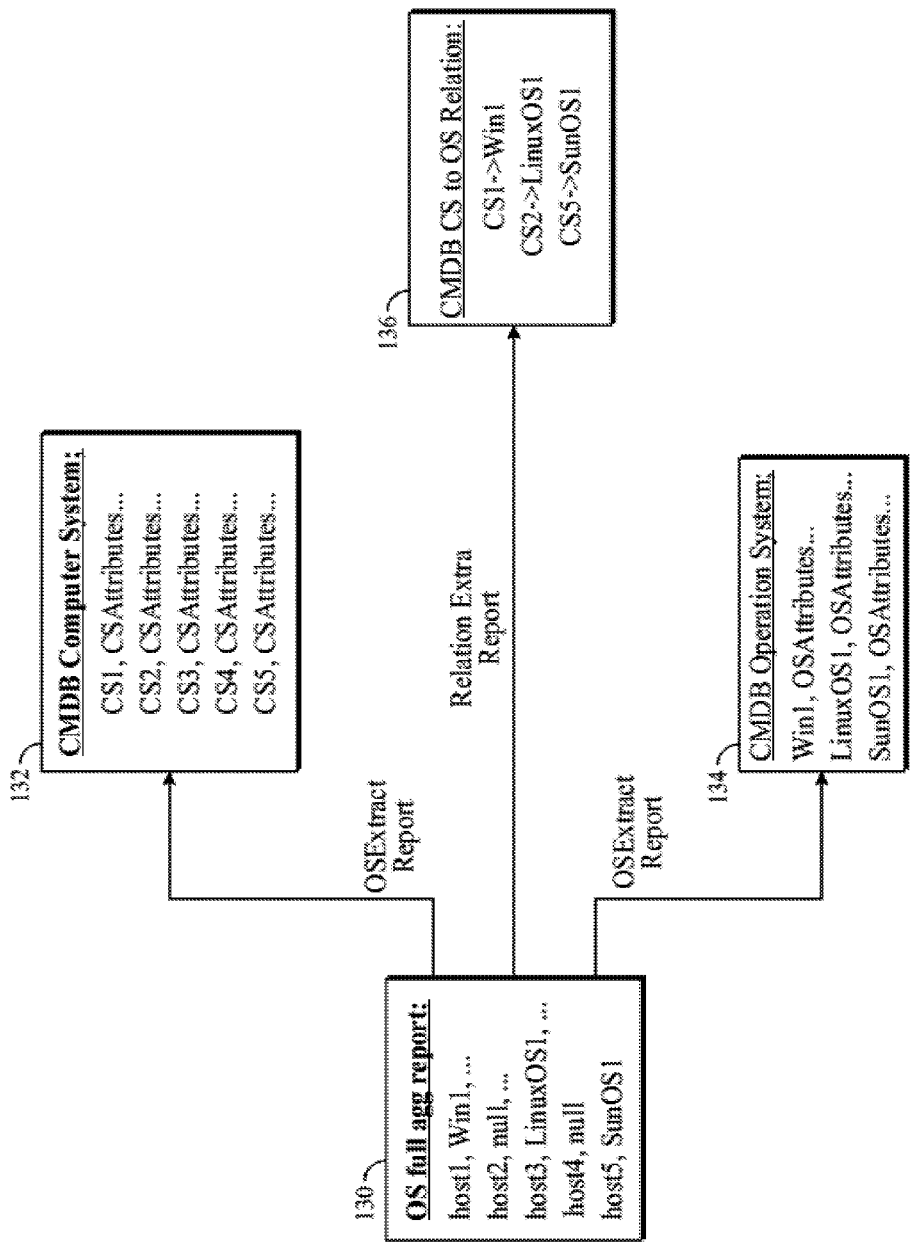
FIG. 12 is a diagram illustrating how BQL reports are used to split aggregated computer system and operating system attribute data into separate BQL reports, one for computer systems and one for operating systems, and one for the relationships between computer systems and operating systems.

The BDNA inventory system collects attribute data about computer systems and operating systems in a single central report. CMDB systems model computer systems and operating systems as separate CIs and a relationship between them. BQL reports are used to do the necessary identity and data splitting transformation and normalizing to match CMDB's data model. An example of this is shown in FIG. 12. Block 130 represents the fully aggregated computer system and operating system attribute data collected by the BDNA system. A BQL report called CSExtractReport extracts just the computer system attributes from the inventory data represented by block 130 and stores the computer system data in a store 132 which is used as an input to the transformation rules for the attributes of computer systems. Another BQL report called OSExtractReport extracts the operating system attribute data and stores it is a store 134 which is used as an input to the transformation rules for operating system attributes. A BQL report called Relation-ExtraReport is executed to extract the relationship data between the computers systems and the operating systems and store it in store 136.

Returning to the consideration of FIG. 7, in step 62, the content writer (a person) for the schema mapping defines transformation rules for mapping BDNA inventory attribute data in the base tables of the BDNA persistent data warehouse to the CMDB schema. Each transformation rule maps a single BDNA source to a single CMDB type. There can be transformation rules mapping a single BDNA source to multiple different CMDB types, but mapping of multiple BDNA sources to a single CMDB type is not allowed. For each rule, the writer of the transformation rule needs to specify: the source; the target; and a mapping from source attributes to target attributes. Some mappings specify value transformations using Java code. An example of some transformation rules working to transform names and units of measure is illustrated elsewhere herein.

Step 64 represents the process of defining a CMDB integration project. Projects need to be defined in some embodiments to allow users to do different CMDB integrations from the same schema. For example, one project may be defined for exporting data to IBM CMDB, while another project is defined for exporting data for BMC, while yet another project may be defined for importing data from an IBM CMDB into the BDNA system.

The input needed to define a project includes: 1) name of the project; 2) path of the directory from where to load the source definitions; 3) path of the directory (or directories) from where to load the transformation rules; 4) vendor name of the vendor of the schema to which the BDNA data is to be transformed; 5) connection details to connect to the CMDB target store (the input source connection is based on the BDNA connection properties in some embodiments); 6) type of data transfer (export or import); 7) any global properties associated with the project; and 8) a description of the project.

Step 66 represents the process of loading all XML specifications associated with the project. There are various components of the XML specification of a transformation project. They are explained more below. A project XML specification is the external form of all information needed to extract BDNA discovery data, map it to the CMDB target ER model, and transform the ER model data out to the target CMDB system. The XML specification is the external set of files to be loaded in a specific BDNA system when we want to do an export to an external CMDB target.

Step 68 represents the process of loading the transformation rules for a given project into transformation engine 152 (usually a programmed computer as is the report engine 146). This step represents the process of parsing the transformation rules and putting the necessary data in database tables.

Step 70 represents the process of executing the transformation rules in the transformation engine 152. The process comprises the steps: 1) checking if all the BQL Reports are up to date and refreshing them if necessary; However, before any transformation is executed the framework (161 in FIG. 20) checks to see if a BQL report exists and if it is up to date compared to the current BDNA discovery data. If no BQL report exists or the BQL report is stale compared to the state of the discovery data, the BQL Report is rebuilt before executing the transformation. 2) generates output tables in a data format that matches the CMDB schema by extracting the attribute data specified in the BQL report from the BDNA base tables using a BQL processor; 3) iterate through each input source and execute the applicable transformation rules using a transform rules processor to populate the output tables (data structures in the Destination ER Model).

Each transformation rule can: map BDNA attribute names into the appropriate CMDB name; do unit conversions; or combine and merge attributes as required by each CMDB.

An example of a Configuration Item sample transformation rule for mapping BDNA's inventory data for a host into BMC's Computer System showing a typical transformation conversion (Name Mapping and Unit Conversion) is given in Table 1 below.

TABLE 1

Example of Transformation Rule Action: Name Mapping and Unit Conversion

| CMBD_OS Report | Mapping Type | BMC_Computer System CI | Comments |
| --- | --- | --- | --- |
| osComputerDomain | Name mapping | Workgroup | |
| Hostname | | HostName | BDNA does not track the next two attributes, reuse hostname |
| hostname | | Description | |
| hostname | | Short Description | |
| serialNumber | | SerialNumber | |
| osComputerDomain | | Domain | |
| flashMemorySize | | FlashMemory | |
| ifThroughput | | DataRate | |
| operatingSystem_Label | | Label | Reuse same name for next attribute |

TABLE 1-continued

Example of Transformation Rule Action: Name Mapping and Unit Conversion

| CMBD_OS Report | Mapping Type | BMC_Computer System CI | Comments |
| --- | --- | --- | --- |
| operatingSystem_Label | | BMC_Name | |
| operatingSystem_id | | Id | |
| Cpu_list | Unit conversion | CpuList | BDNA collects a string. BMC expects a numeric value. For example: "i586" should be mapped to 0, "PowerPC" should be mapped to 3, and "ARM" should be mapped to 8 |
| totalMemory | | TotalPhysical Memory | BDNA tracks total memory in megabyte units, BMC expects the value to be represented as gigabytes, divide by 1024 |
| Hostname, nicList | Merge attributes | BDNAUniqueInfo | BMC requires a unique name for each Computer system CI, generate one by combining hostname and mac address of the system. |
| Type_cs, hardware | | Category, type_attr, item, manufacturerName, Model | BDNA collect information about the type of computer into just two attributes. BMD requires that the data be split into 5 different attributes. The BCM_ComputerSystem_XFR rule contains java code to parse the two attributes and generate the five expected by BMC |

The transformed attribute data is stored in an ER Model store 154 to await export to the target system.

Finally, in step 72, the data in the output tables is exported to the target CMDB using the appropriate export adapter. An IBM CMDB requires adapter 156 to extract the BDNA data into an intermediate XML form. If the target system is a BMC CMDB, the BMC CMDB can be directly connected to the ER Model 154 using JDBC and does not require an adapter.

Figure 9:
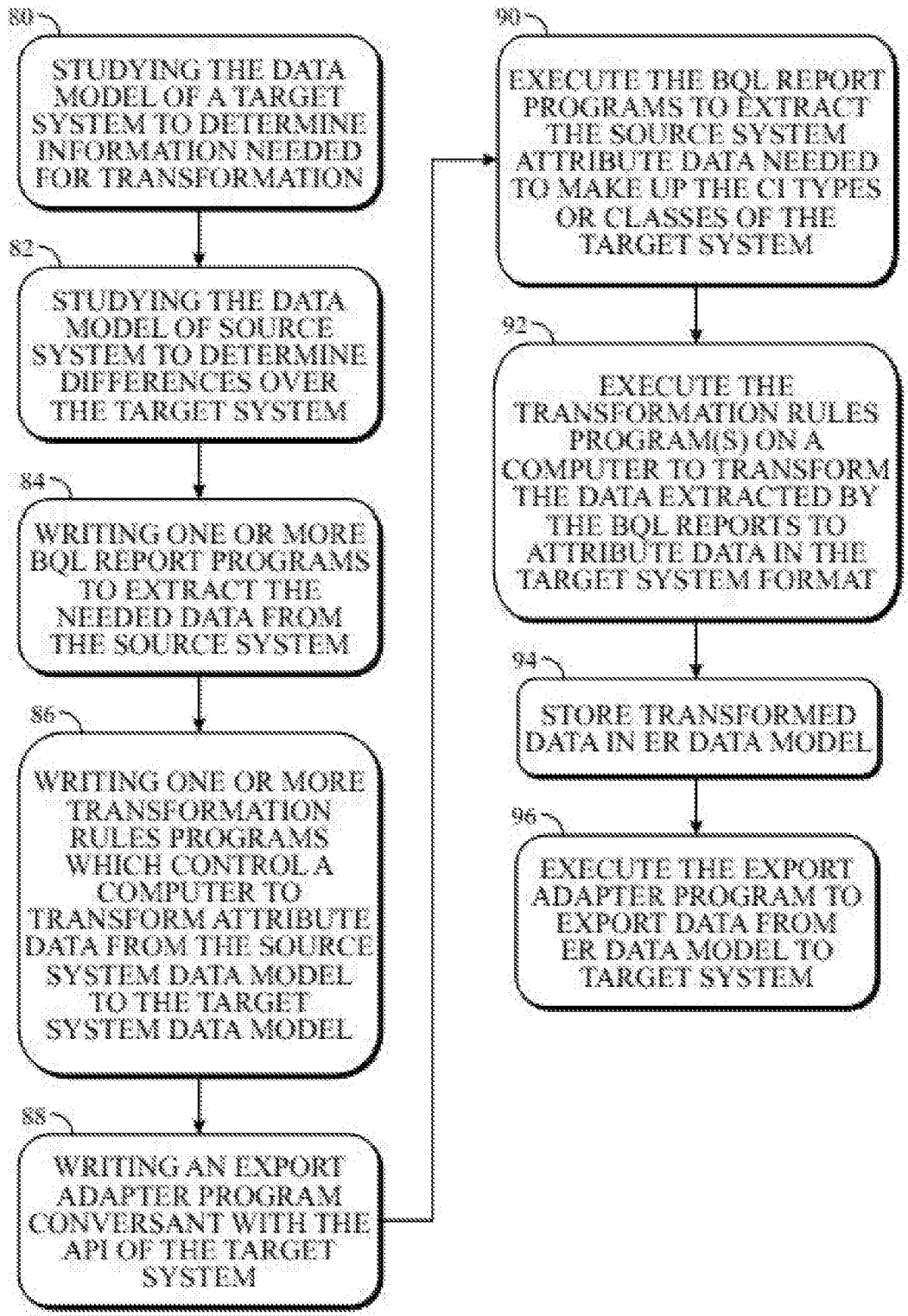
FIG. 9 is flow diagram of the business method for transformation of attribute data from the data model of the source system to the data model of the target system.

FIG. 9 is a flowchart of a method of doing business to do the data transformation which includes the manual steps of writing the BQL report programs, writing the transformation rule programs, and writing the export adapter program. Step 80 represents the process of studying the data model of the target system to determine the class definitions, subtype relationships and containment relationships and to determine the semantics and data types and units of measure of each attribute of each class of asset and each subtype thereof and any other information needed to do the transformation.

Block 82 represents the process of studying the data model of the source system to determine the differences over the target system. Things that need to be determined are such things as: 1) which attributes are collected about each type of asset that is within a class definition in the target system data model; and 2) what are the differences between the data format, units and semantics of the attribute data in the source system versus the data format, units and semantics the attribute data would need to be in for storage in the appropriate class defined for the target system data model.

Block 84 represents the process of writing one or more BQL report programs capable of controlling a computer to extract for every CI type in the target system, the necessary attributes for the CI type in the target system which have been collected from the same type asset collected in the source system.

Block 86 represents the process of writing one or more transformation rules programs which can control a computer to change the format, units and semantics of attribute data from the source system to the format, units and semantics compatible with the target system.

Block 88 represents the process of writing an export adapter which can control a computer to invoke the application programmatic interface (API) of the target system and use said API to load data into said target system. The export adapter is written so as to be conversant with the application programmatic interface of the target system in that the export adapter knows the function calls to make and knows the arguments to supply to store data in the target system.

Block 90 represents the process of executing the one or more BQL reports on a computer to extract the attribute data needed from the source system to make up the CIs of the target system.

Block 92 represents the process of executing the one or more transformation rules programs to take the attribute data extracted by the BQL reports and transform it to the data format of the target system.

Block 94 represents the process of storing the transformed attribute data in an ER data model store. The ER data model store is typically comprised of tables having the data structure of the tables used to implement the target system data model.

Block 96 represents the process of executing the export adapter program on a computer to export data from the ER data model store to the target system.

Object Oriented Transformation Rules

In the preferred embodiment, the transformation rules are written in an object-oriented style. This means, for example, that where a CI type such as ComputerSystem CI 11 in FIG. 1A to FIG. 1C has subtypes which are species of the genus, there are generic transformation rules that apply to all species or subtypes (and are inherited by all subtypes) within the class and there are specific transformation rules for each species or subtype within the class. The combination of both the generic transformation rules and the specific transformation rules for the subtypes are used to transform the attribute data from the source system needed for the ComputerSystem CI and all its subtypes such as Windows computers, Sun Sparc stations, etc. In other words, for a specific species or subtype of the parent ComputerSystem CI, the transformation rules of the ComputerSystem CI which are common to all species are used to transform attribute data from the source system into attribute data of the target system for all the species or subtype CIs. To finish the process, transformation rules specific to each particular subtype are used to transform the attribute data from the source system which is peculiar to the subtype into attribute data into the data format of the target system. That transformed data is used to populate the subtype CI instances.

The generic (for the parent CI) and specific (for the subtype CI) transformation rules for a subtype can be executed in any order. Transformation rules that are common to a CI type with subtypes are stored in an object which is the parent of subtype objects each of which store transformation rules which are unique to the transformation of attribute data unique to the subtype, as shown in FIGS. 10 and 11.

Figure 10:
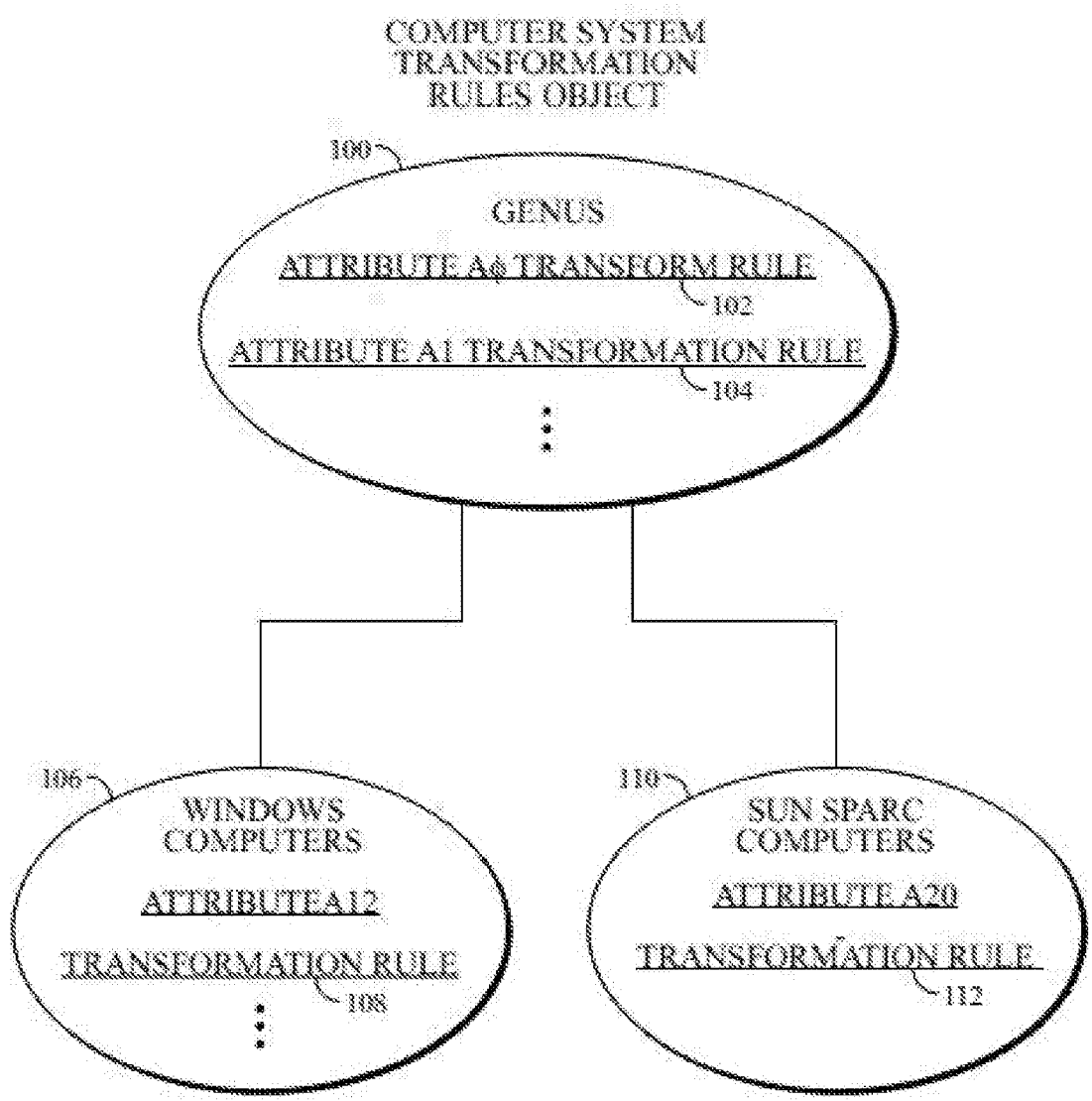
FIG. 10 illustrates a class diagram for the object-oriented transformation rules objects for storage of the Transformation Rules, of the ComputerSystem CI with two subtypes illustrated.

FIG. 10 illustrates a class diagram for the objects which store the object-oriented transformation rules for storage of the Transformation Rules of the ComputerSystem CI with two subtypes illustrated. Object 100 represents a memory object with a plurality of attributes, each with a name and a value. One of those attributes is shown at 102 and another at 104. Each attribute has a name which is not important and each has a value. The value is the transformation rule string (or a pointer thereto in some embodiments) which defines how to transform attribute data from the source system into attribute data in the proper format for the target system for one particular attribute of the ComputerSystem CI or class. Each attribute in the object 100 is a transformation rule pertaining to transformation of attribute data instances of one named attribute in the ComputerSystem Cl.

Subtype object 106 is the object with attributes which are transformation rules for the Windows computer subtype. Attribute 108 is an attribute of object 106 which stores a string which is the transformation rule for a particular attribute of the Windows computer subtype. Subtype object 110 is the object with attributes which are transformation rules for Sun type computer systems. Object 110 has an attribute 112 which stores a transformation rule for attribute A20 of the Sun Sparc computer systems.

Figure 11:
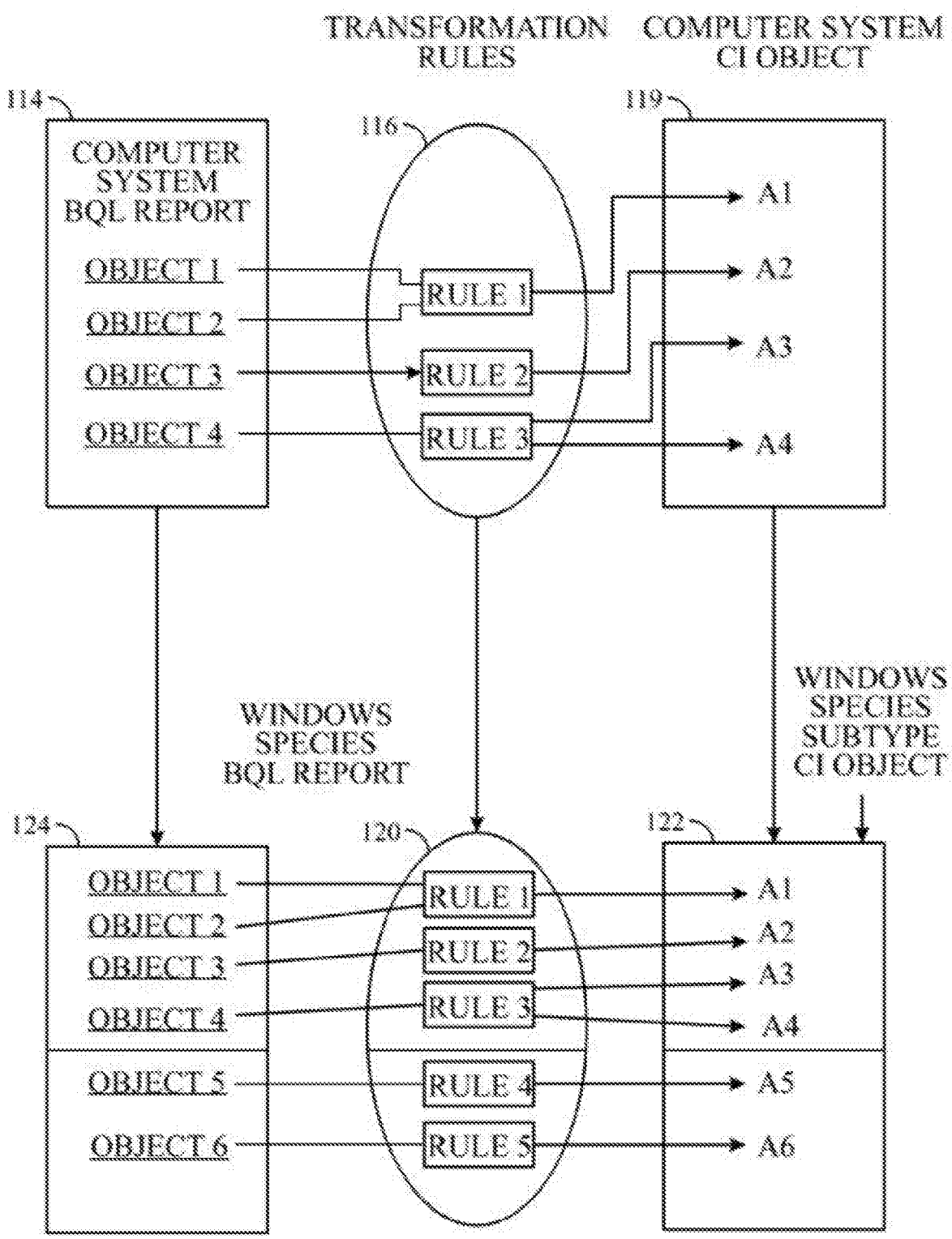
FIG. 11 is a diagram illustrating how the object oriented transformation rules can combine-transform information from two or more objects in the inventory attribute data extracted by the BQL report from the source system to write a single CI in the target system or split-transform information from a single object extracted by the BQL report from the source system into two or more CIs in the target system.

FIG. 11 is a diagram illustrating how the object oriented transformation rules can combine-transform information from two or more objects in the inventory attribute data extracted by the BQL report from the source system to write a single CI in the target system or split-transform information from a single object extracted by the BQL report from the source system into two or more Cls in the target system. FIG. 11 also shows a subtype object 120 having as its attributes the transformation rules 1-3 inherited from the parent object 116, and having transformation rules 4 and 5 which are unique to the particular subtype Cl.

The attribute data extracted from the source system as a BQL report is object 114. Object 114 is the BQL Report for the ComputerSystem CI type represented by object 118. The attributes of object 114 are the individual attribute values which have been extracted from the source system by the computer running the BQL report program in the source system data format. The object represented by oval 116 is the object storing the transformation rules for the CI object 118 which represents a CI type which has one subtype CI 120. The attributes of the object 116 are the transformation rules themselves which are written to transform the source system attribute data stored in objects 1-4 into attributes A1, A2, A3 and A4 of the CI object 118. Object 118 represents the target system data model object for a particular CI type which has the attributes A1, A2, A3 and A4. The particular example shown has transformation rule 1 transforming the data from objects 1 and 2 in the BQL report into the data format of and populates attribute A1. Rule 2 transforms the BQL Report object 3 into the data format of and populates attribute A2. Rule 3 transforms the BQL Report object 4 into the data format of and populates the attributes A3 and A4.

CI object 118 has a subtype CI object 122. This subtype CI 122 inherits attributes A1 through A4 from the parent CI 118 and has its own attributes A5 and A6 unique to this subtype. Transformation rules subtype object 120 inherits transformation rules 1 through 3 from the parent transformation rules object 116 and has additional transformation rules 4 and 5. Rule 4 transforms attribute data stored as object 5 in Windows ComputerSystem BQL report subtype object 124 into the data format of and populates attribute A5 of the Windows species subtype CI object 122. Rule 5 transforms attribute data stored as object 6 in BQL report subtype object 124 into the data format of and populates attribute A6 of the Windows subtype CI object 122.

Object 120 can but does not necessarily have to have rules 1, 2 and 3 recorded therein because of the parent-subtype relationship. It may refer processing to implement these transformation rules to the code that implements these rules in parent object 116. It does not matter whether the inherited rules are processed first and then the rules specific to the subtype are processed.

The object-oriented transformation rules structure is useful because in a typical system the source system and target system data models have thousands of classes and subclasses each of which has many attributes. Therefore, there are even more transformation rules than there are classes and subclasses. If all the transformation rules of a parent class had to be copied into each subtype or child class, and there were many subtypes, each time a transformation rule for a parent CI object attribute was changed, it would have to be changed for all the subtype CIs also. By storing the transformation rules common to all the subtypes of a parent CI only in an object that stores transformation rules for the parent CI, each time one of these transformation rules was changed, it would have to be changed in only one location. Each subtype CI's transformation rules would be stored in objects unique to those subtypes. When the attributes of the subtype CI were to be populated during a transformation process, the transformation rules for the parent CI type would be executed and then the transformation rules for the subtype would be executed, in no particular order since there is no dependency between the two sets of transformation rules or their input data.

It is more difficult to create object-oriented transformation rule sets because it is initially difficult to determine which transformation rules are common to all subtypes. However, once that is done, the maintenance of the rule set is much easier. For example, suppose the parent CI has 20 attributes and there are 10 subtypes. If there are 20 transformation rules for the parent, without object-oriented transformation rules, there would have to be 2000 copies made of the transformation rules for storage in objects that store transformation rules of the subtypes. By having the transformation rules stored in an object-oriented data structure, with the transformation rules common to all the subtypes stored in a parent object and the transformation rules for each subtype stored in objects unique to the subtypes and linked to the object storing the common transformation rules, duplication of the common transformation rules into all the subtype objects can be avoided.

Mechanism to Build Self Consistent Blocks of Entities to be Loaded into a CMDB

Goals

The goal of this embodiment is to output the data that is collected in a schema (set of tables with relations between them) so as to load the data in a CMDB system or any external system.

It is assumed that the data being loaded to the target system is preprocessed so that it is stored in tables consisting of:

1. entity tables that contain instances of objects that have attributes
2. relationship tables that contain instances of relations, where relation contains references to two instances (in other words relates one instance to another instance).

The main issue discussed here is how to partition the complete set of data to be loaded into smaller blocks. It is impractical to assume that the whole model can be processed as a single operation for a CMDB for any but the simplest toy examples.

Various CMDB systems impose requirements on the blocks of data that can be loaded. The following list summarizes the requirements imposed on the data that is loaded into a CMDB system:

1. The data being loaded needs to be broken down into blocks of data since loading the entire data as a single entity may not be possible for systems to handle. This requirement is imposed by the fact that the total amount of data to be loaded can be extremely large since BDNA discovery run against a large enterprise collects huge amount. There are various limits imposed by systems that disallow loading of such large amount of data as a single operation. Typical systems require the data to be broken down to smaller blocks of manageable sized data. There is a limit on the size of the blocks that can be loaded into the CMDB systems. This limit is called as the "maximum block size".

2. Each block of data needs to be self-consistent which means if the block contains a relationship instance (R1 that relates Entity E1 to Entity E2), the related entities must be part of the same block. In other words it would be illegal to send Relation R1 and Entity E1 in one block and Entity E2 in another block. Note that there may be situations where the same entity needs to be sent as part of multiple blocks so as to satisfy this requirement. For example assume that each block can contain up to 500 objects. Assume that one instance E1 is related to 600 other instances. It won't be possible to end E1 and all its related instances in one block due to the size limitation. But it would be permissible to divide the data such that one block has E1 with 300 related instances and another block has a second copy of E1 along with the remaining 300 related instances. The target CMDB has the capability to relate the two instances of E1 that arrive in different blocks and illustrates how they are same.

Note that self-consistency of the blocks is required because the target system may be storing the objects in its own schema. Database schemas typically enforce referential integrity [available in any database reference e.g., C. J. Date, *An Introduction to Database Systems*, Eighth Edition, Addison Wesley, 2003.]. Such referential integrity makes sure that the data made available in the database is consistent (i.e., it "makes sense"). For example the definition of a relation is incomplete unless you know which objects are being related to each other.

3. The goal is to load the CMDB system as efficiently as possible. Efficient loading of the system requires:
   a. Each block must be built so that it is as close to the specified size limits possible. There is an overhead to processing a block. So having a very large number of small blocks is inefficient compared to having fewer larger blocks. However having very large blocks also leads to inefficiencies. There is an optimal block size that can be computed (and having blocks slightly smaller than ideal block size is acceptable however it is not desirable to exceed the). Computation of the optimal block size is outside the scope of this application. However the scope of this application is to attempt to build blocks as close to the
   b. The duplication of data must be minimized. So the goal is to avoid sending the same entity multiple times as far as possible. Typically the size limit may force the process to copy entities, but such copying should be minimized since the object gets loaded in the target system when the first copy is loaded. Subsequent copies are required for consistency of the blocks but do not add additional information to the target system.
   c. Also note that the data being loaded is typically stored in a database. As a result the efficiency of computation needs to be measured in terms of database operations.

Background

This embodiment concerns the loading of data from the output schema to the CMDB system (or any external system). It is assumed that previously the data has been transformed into a database schema that corresponds to the data model of the target CMDB. The database schema consists of:

1. Entity tables: these tables contain the entities that correspond to CIs in the target CMDB.
2. Relationship Tables: These tables define relations between two entities possibly of two different types. For example, assume two CI types say, ComputerSystem and OperatingSystem types. The ComputerSystem CI type refers to the hardware that is found by discovery process and the OperatingSystem CI type represents the Operating System e.g., Linux, Windows etc. that is installed on a given hardware. There can be relationship between the instances of these two types called InstalledOn. Each instance of the relationship identifies one instance of ComputerSystem (say CS1) and one instance of OperatingSystem (say OS1) such that OS1 is installed on CS1. The relation is directed which means that the two end points of the relation are asymmetric. For example, in the above instance of OS1 being installed on CS1—the relationship doesn't imply that CS1 is installed on 0S1 (which is meaningless). Note that the relationship between two types T1 and T2 could be
   a. 1-1 Relation: where each instance of T1 is associated with one and only one instance of T2 (and vice versa).
   b. 1-N Relation: where each instance of T1 is associated with possibly multiple instances of T2. For example multiple Operating Systems may be installed on the same hardware machine.

c. M-N Relation: where multiple instances of T1 may be associated with multiple instances of T2 e.g., the relation between IP addresses and machines—one IP address can be used by multiple machines and a single machine can have multiple IP addresses.

Note that dividing a given set of data into smaller blocks for various purposes has been discussed in prior art (e.g., paging mechanisms used by Operating Systems, reference: Deitel, Harvey M. (1983), *An Introduction to Operating Systems*, Addison-Wesley, pp. 181, 187, ISBN 0201144735). The main difference between the problem discussed in this application compared to the prior art is that the mechanism discussed here is specific to the kind of data that consists of entities related to each other and blocks being built need to satisfy constraints that require processing and understanding the data at a semantic level whereas the paging mechanisms such as those used by Operating Systems are very generic and apply to any kind of mechanism. Using a mechanism similar to the one used in Operating Systems to builds blocks for the purpose of loading a CMDB may result in inconsistent blocks that cannot be processed by the target CMDB systems. If blocks were constructed using arbitrary mechanisms for an Operating Systems paging mechanism the blocks most likely result in bad performance of the Operating System (but the blocks would not be considered invalid), whereas for loading a CMDB systems one could easily generate blocks that cause errors while loading in the CMDB and would be considered invalid blocks. Such errors would happen e.g., if a relation instance was added to the block without adding both the entities related by the relation.

Terminology

FIGS. 21 through 28 will be used to illustrate the concepts discussed herein.

Figure 21:
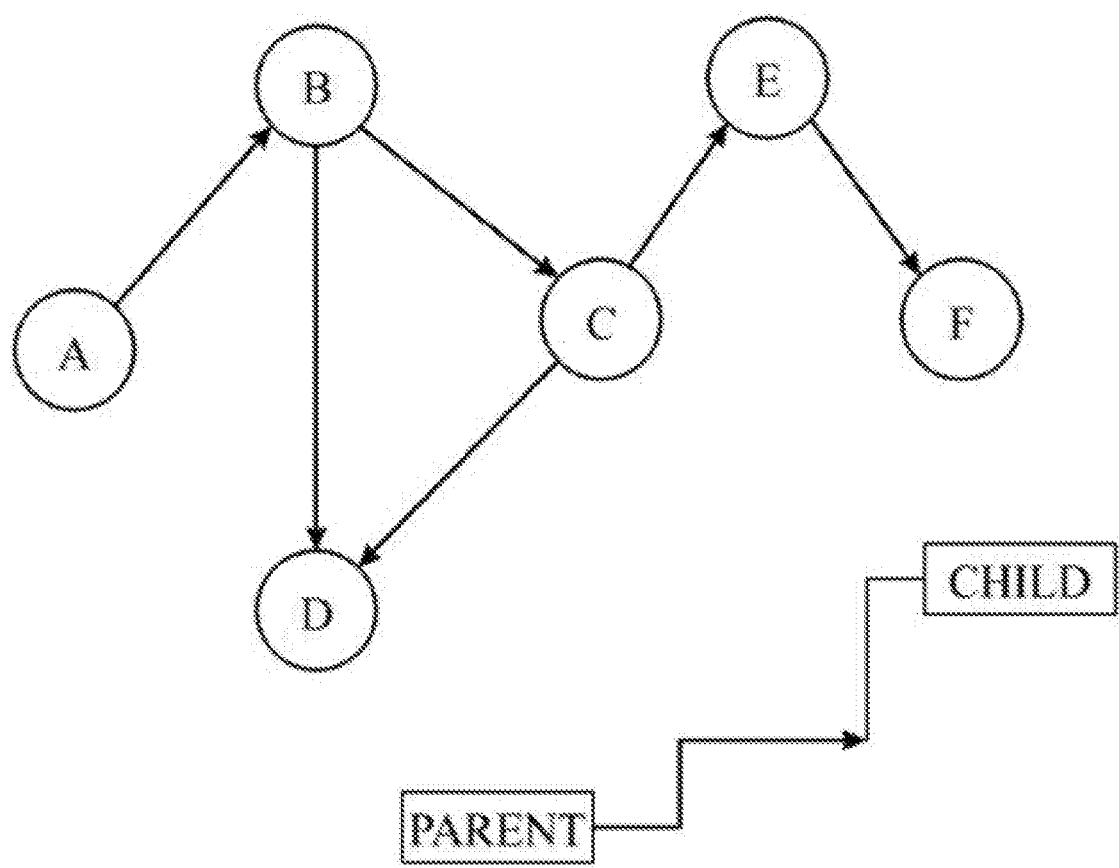
FIG. 21 is an example showing a set of output tables with relations between them. Each output table corresponds to a CI Type being output to a CMDB. The Arrow indicates a relationship between two tables. The relationship can be considered as a pair of two type of entities (PARENT, CHILD), the head of the Arrow being the CHILD and the tail being the PARENT.

FIG. 21 is an example showing a set of output tables with relations between them. Each output table corresponds to a CI Type being output to a CMDB. The Arrow indicates a relationship between two tables. The relationship can be considered as a pair of two type of entities (PARENT, CHILD), the head of the Arrow being the CHILD and the tail being the PARENT.

Figure 22:
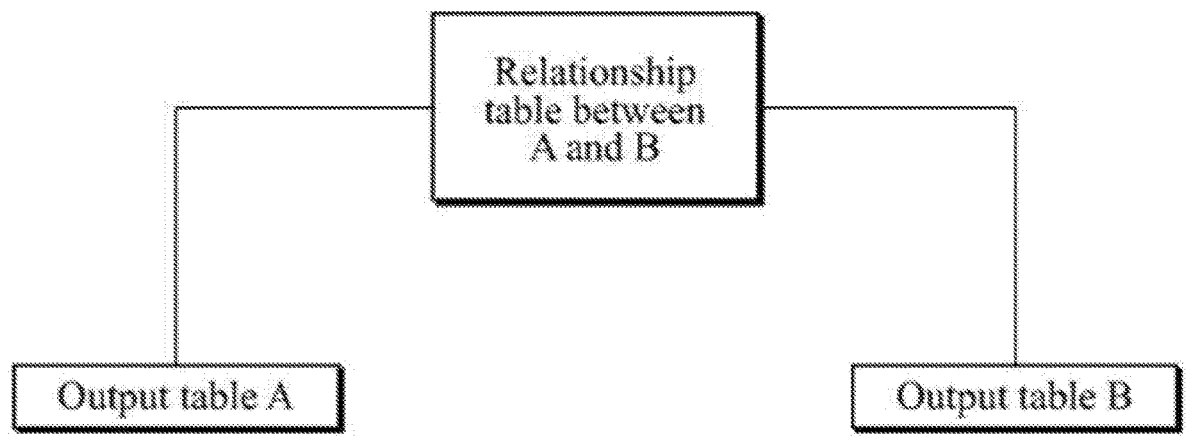
FIG. 22 shows an example of relationship between two entity tables. This Illustration only shows the metadata.

FIG. 22 shows an example of relationship between two entity tables. This Illustration only shows the metadata.

Figure 23:
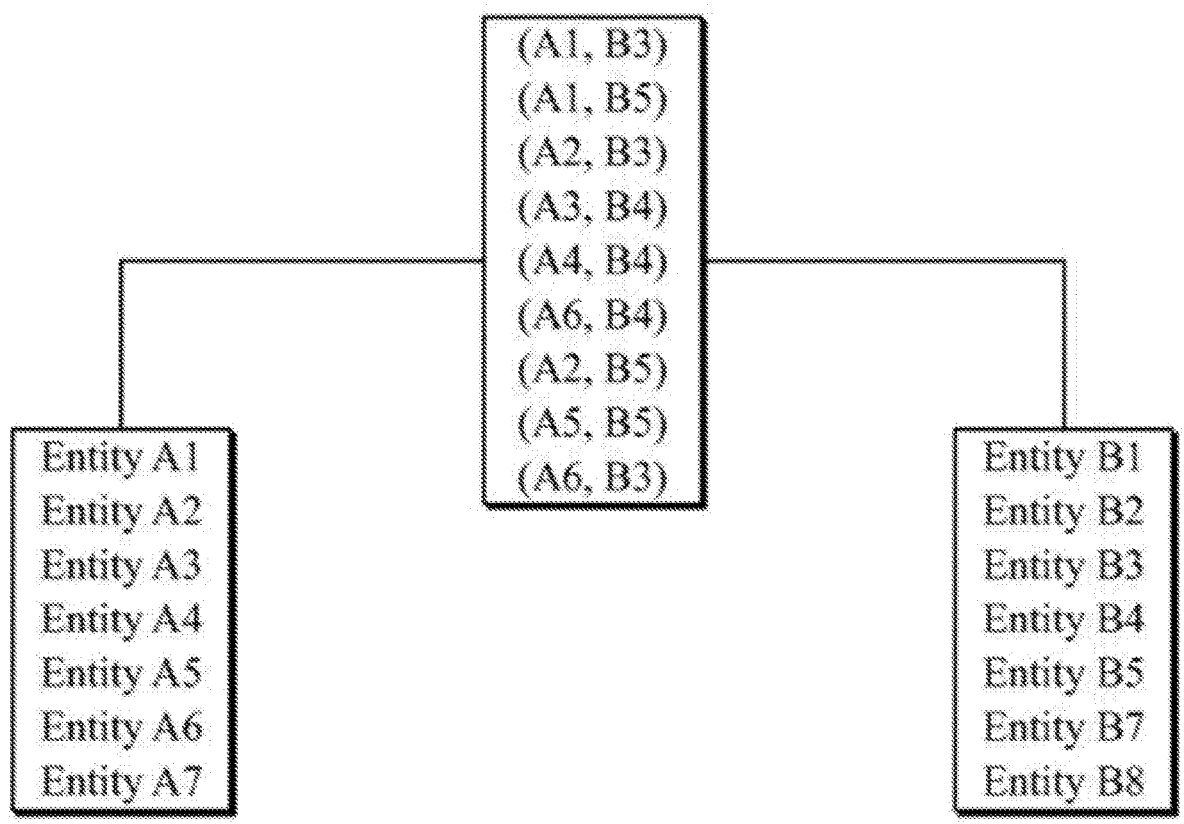
FIG. 23 shows example data in the tables shown in the relation example given in FIG. 22.

FIG. 23 shows example data in the tables shown in the relation example given in FIG. 22.

Figure 24:
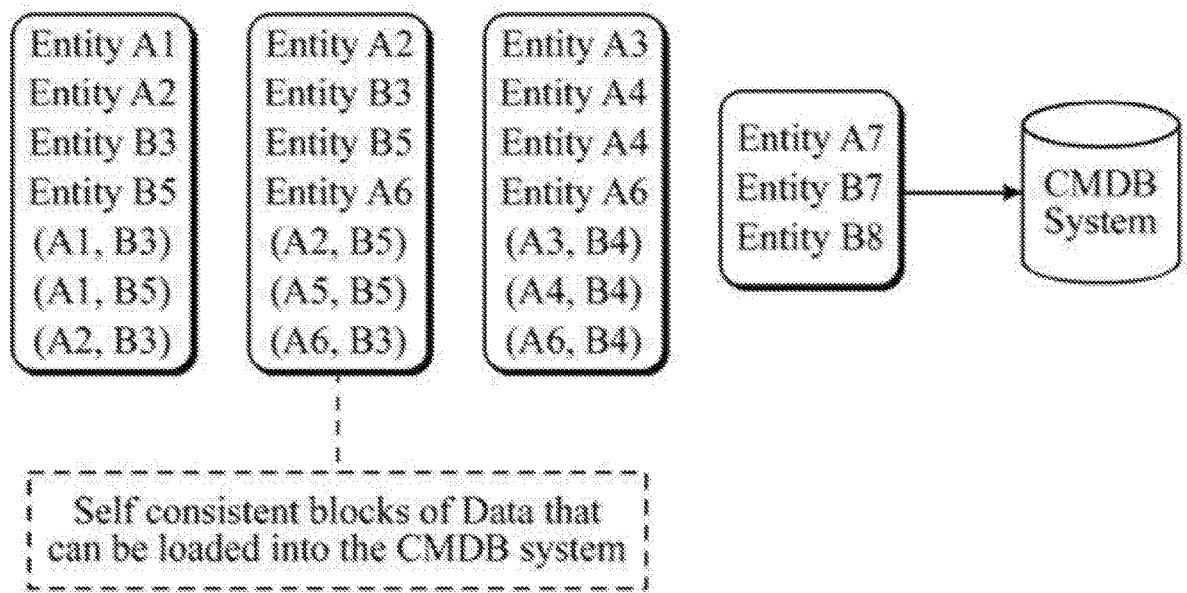
FIG. 24 shows examples of blocks that load data to the target CMDB system.

FIG. 24 shows examples of blocks that load data to the target CMDB system.

Figure 25:
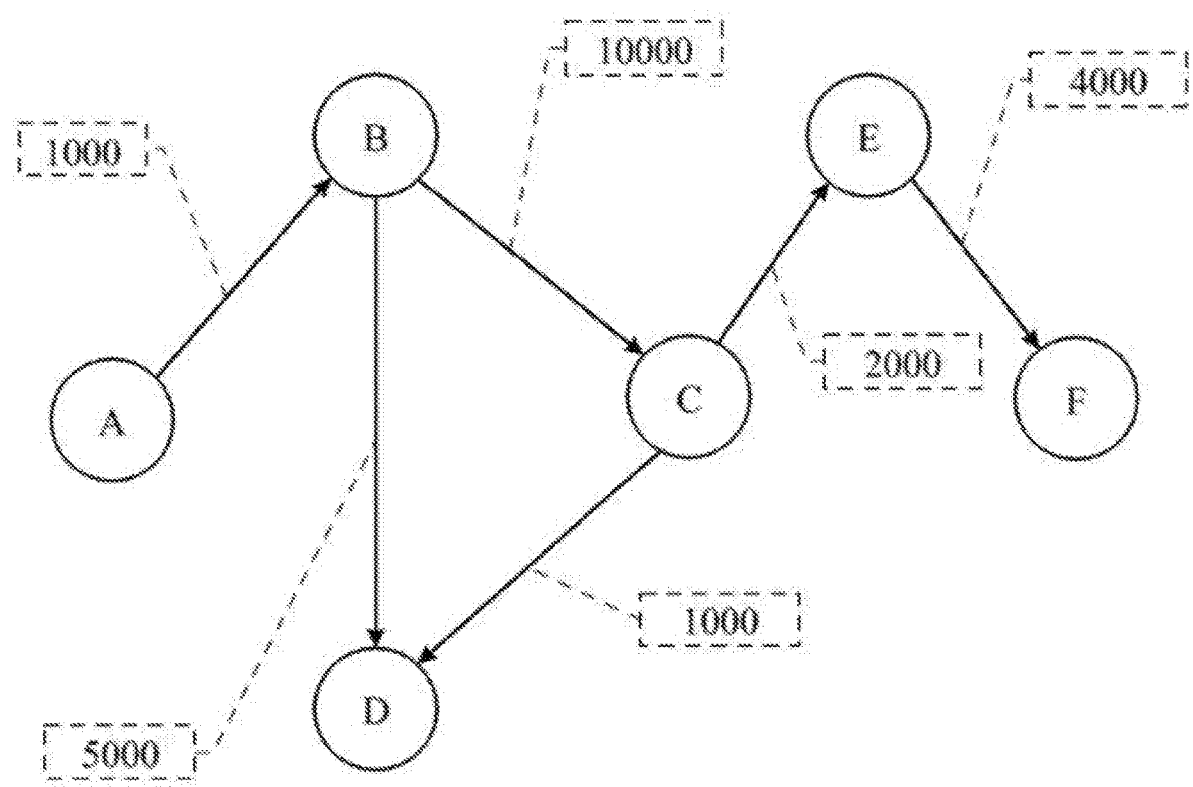
FIG. 25 shows the cardinality of each relationship added to the example graph shown in FIG. 21.

FIG. 25 shows the cardinality of each relationship added to the example graph shown in FIG. 21.

Figure 26:
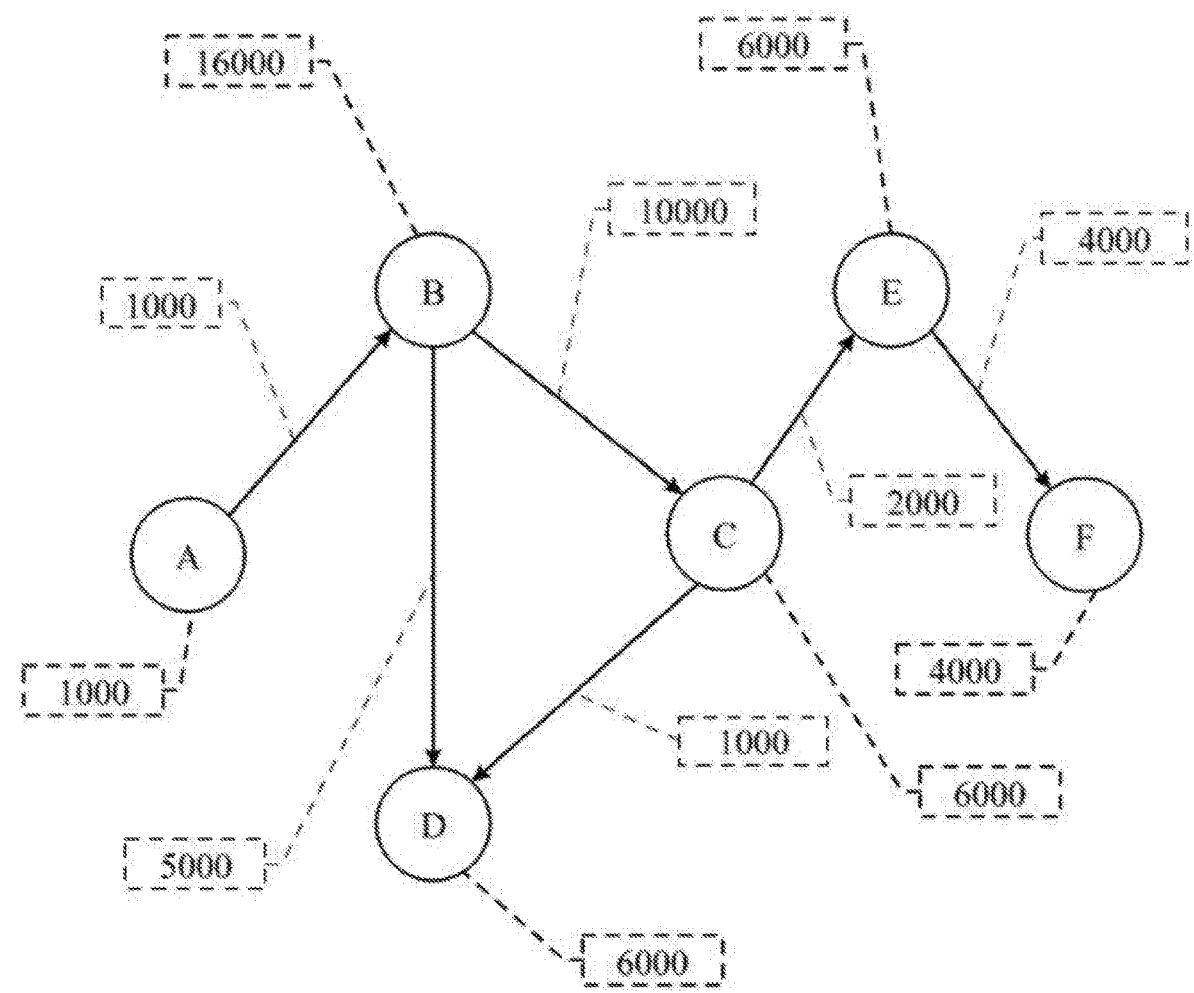
FIG. 26 shows the connectivity metric of each entity type added to the graph shown in FIG. 25.

FIG. 26 shows the connectivity metric of each entity type added to the graph shown in FIG. 25.

Figure 27:
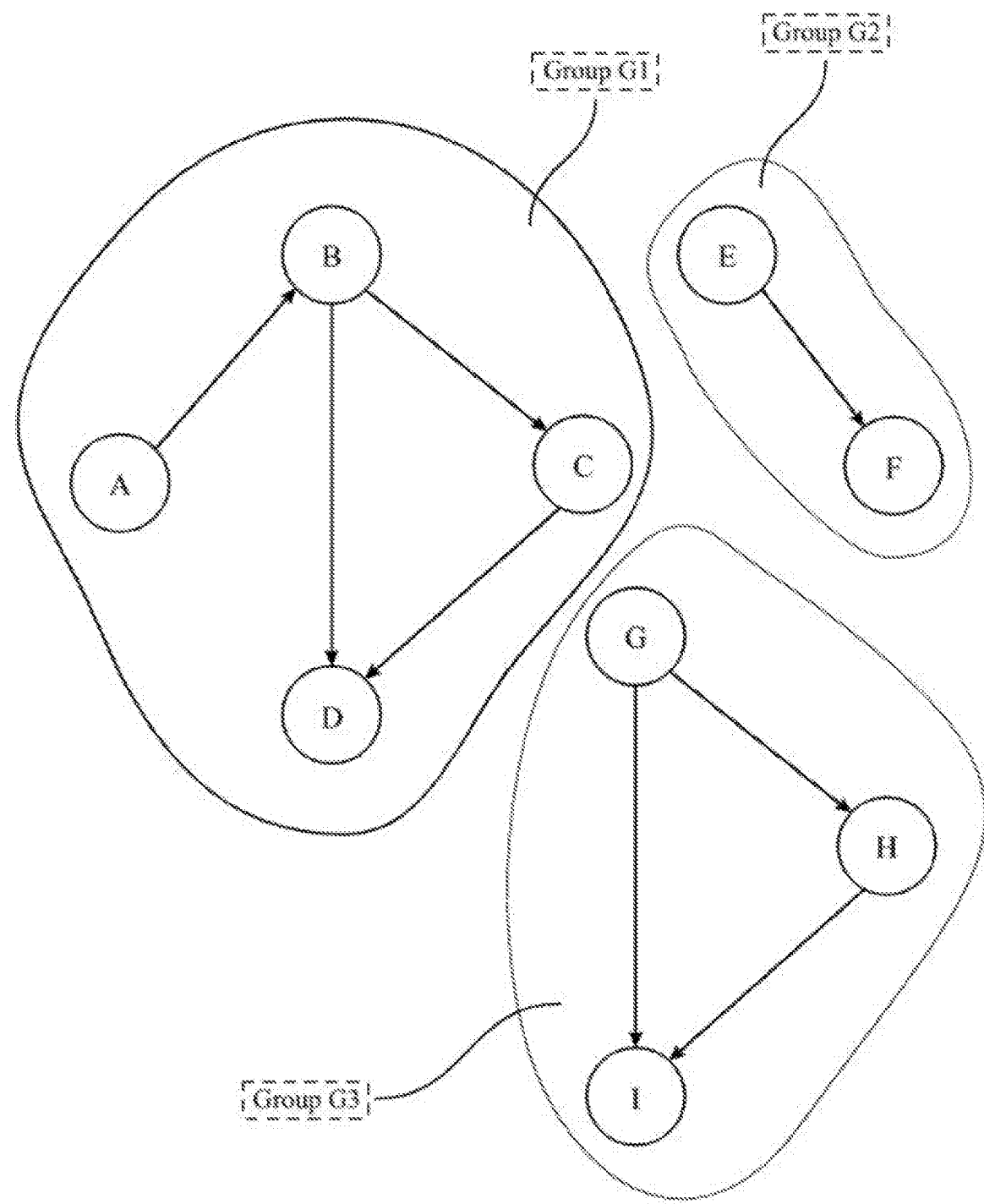
FIG. 27 illustrates how to divide a graph consisting of 9 nodes A, B, C, D, E, F, G, H and I into three groups G1, G2 and G3.

FIG. 27 illustrates how to divide a graph consisting of 9 nodes A, B, C, D, E, F, G, H and I into three groups G1, G2 and G3.

Figure 28:
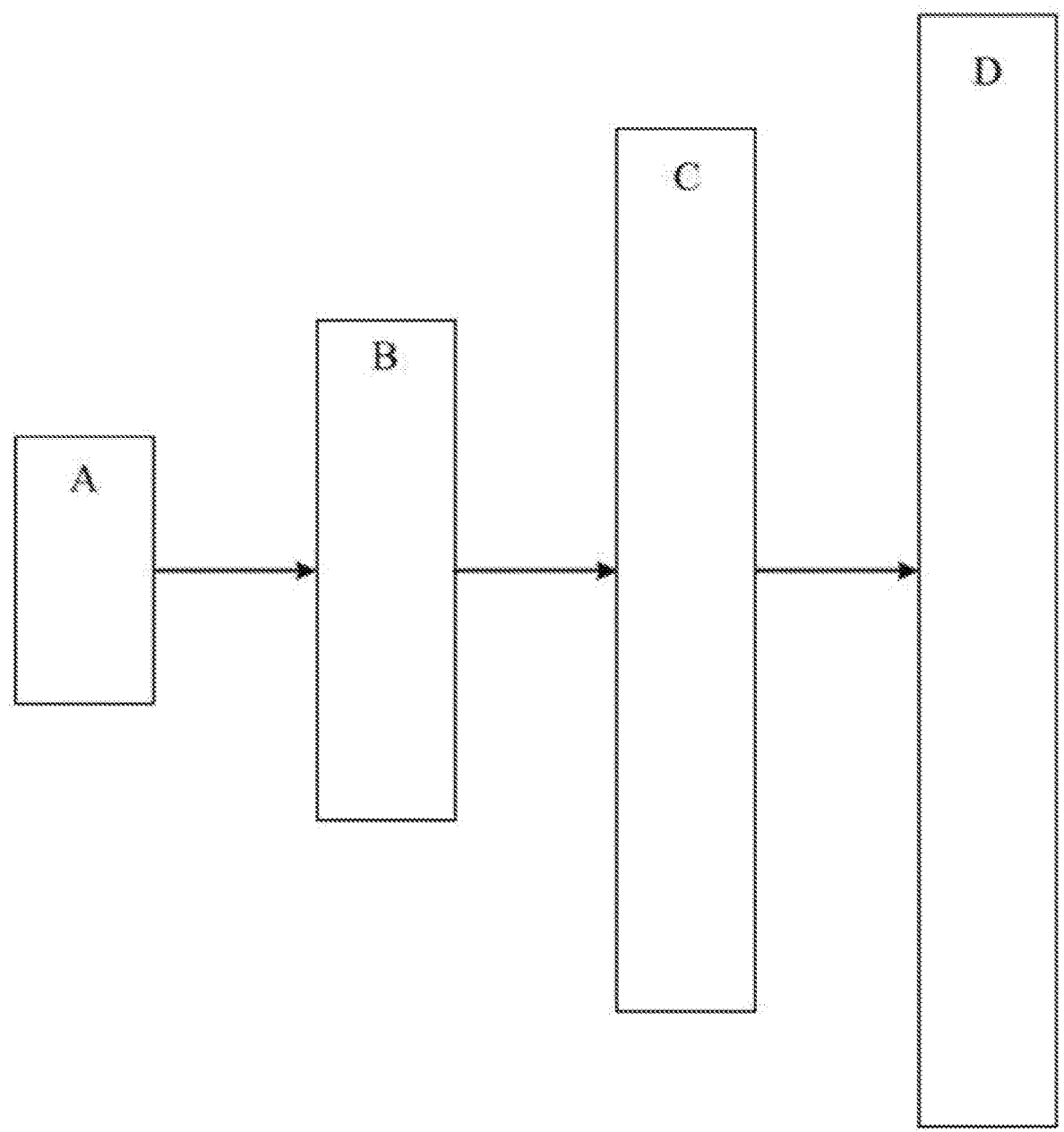
FIG. 28 shows and example illustrating how an approach that processes nodes of the graph in a random order may lead to inefficiency of execution.

FIG. 28 shows an example illustrating how an approach that processes nodes of the graph in a random order may lead to inefficiency of execution.

Note that the terms Graph, nodes and edges are not defined here but have the usual meaning as per any Computer Science text.

Typically in this document, the graph represents a schema storing entities and their relationships in a database schema to be output to a CMDB. The terms nodes is used synonymously with the term Entity Types in the output schema and the term edges is used synonymously with relationships between such Entity Types Distance between two nodes in a graph: the distance between two nodes in a graph is the number of edges that need to be traversed to get from one node to the other. For example, in the graph in FIG. 21, the distance between nodes B and D is one because only one edge can get us from B to D. On the other hand, the distance between nodes B and E is 2 (need to traverse edges B 4 C and C 4 E) and the distance between nodes B and F is three (need to traverse edges B 4 C and C 4 E and E 4 F.

Project: A Project is the complete set of data and metadata that is accumulated so as to be able to load the discovered data into a CMDB system. Such a project includes the actual instances of all the discovered entities, their relations, and any metadata required for processing the data so as to enable loading the data into a CMDB.

Group: A group is a set of entity types and relationships that should be processed together. Any two entity types from two different groups are not connected directly or indirectly by any set of relationships. Given the set of entities {A, B, C, D, E} and the relations {A→B, B→C}, the relationships and entity types can be grouped into two groups G1={A, B, C, A→B, B→C} and G2={D, E}.

Block: A block is a consistent set of entities and relations instances that can be processed for outputting to a CMDB together as a single operation (transaction). The project configuration has a 'blockSize' which defines the maximum number of entities that can be included in a block.

Dividing Input Entity Types into Groups

Since the main constraint while building blocks using entities is to put related entities together in a block, any two entity types that are not connected to each other through relations can be processed independent of each other. There is no reason to put entities from two unrelated entity types in the same block—unless there was space available in the block and there was no reason to add more entities to satisfy the constraints arising due to relations.

A typical graph formed by entity types and relations can be divided into multiple groups of entity types such that no two entity types belonging to two different groups have a relation between them. For example FIG. 27 shows a graph that can be divided into three groups. Note that there are several mechanisms available in the prior art that can be used to divide the graph into disconnected groups [*Introduction to Algorithms* (Second Edition) by Thomas H. Cormen, Charles E. Leiserson, Ronald L. Rivest, and Cliff Stein, published by MIT Press and McGraw-Hill]. We do not describe any such mechanism here. But note that such a mechanism must be used so that each group can be processed independently. The following pseudocode depicts how the computation of groups guides the subsequent process of building the blocks (the TransformationProject object stores the metadata including the graph; assume that the getGroups( ) method of the TransformationProject object knows how to compute the groups in the graph associated with the transformation project).

```
public void doOutput(TransformationProject project)   {
    Set groups = project.getGroups( ); // compute all the groups
    in the project
    for (each group belonging to groups) {
        process group;
    }
}
```

The next section discusses the details of the steps used for computing the blocks of the appropriate size for a given group.

Heuristic-Based Method to Build Self-Consistent Blocks

In the following discussion we assume that the size of the blocks is predominantly determined by the number of entities in the block. This makes the following assumptions:

1. The size of the relations are not significant
2. All entities are or approximately the same size.

If necessary, adjustments can be made for any discrepancies caused by the two assumptions:

1. We can actually assume a non-zero finite size per relation (typically all relation instances have the same size since the basic information in a relation instance is the identity of parent and child entities). The number of entities per block can be reduced by a specific fraction that makes adjustments for the relation instances added to the block.
2. If there are huge differences between the sizes of the entities of different types, the number of entities per type in the block must be weighted accordingly. The details of such a weighting mechanism are not presented in this document. However such a mechanism would be an extension to the mechanism presented here.

The following are the steps followed by the heuristic-based mechanism to build self-consistent blocks of data for one group of entity types and relationships. We use the example graph shown in FIG. 21 throughout the following description to illustrate the method:

1. Compute Relationship Cardinality: The cardinality of each relationship is computed. In the database implementation, each relationship is represented by a table. It is simple to compute the total number of rows in each relationship table. The resulting data is shown in FIG. 25 where the example graph from FIG. 21 is taken and each arrow corresponding to a relationship is augmented with its cardinality. In the example shown in FIG. 25 the following cardinality values are assumed for the relationships:

| No | Relationship | Count |
|----|--------------|-------|
| 1  | A → B        | 1000  |
| 2  | B → C        | 10000 |
| 3  | B → D        | 5000  |
| 4  | C → D        | 1000  |
| 5  | C → E        | 2000  |
| 6  | E → F        | 4000  |

2. Compute Connectivity Metrics for Entity types: For each entity type compute the connectivity metric which is defined as the sum total of the cardinality of all relationships that are either incoming to the entity type or outgoing from the entity type. For example for entity type B, relationship A 4 B is incoming and relationships B 4 C and B 4 D are outgoing. The sum total of the cardinality of all the relationships incoming to and outgoing from entity type B is 1000+10000+5000=16000. This value represents the connectivity metric for entity type B. Similarly the connectivity metrics of the remaining entity types are computed.

| No | Entity Type | Calculation showing sum of incoming/outgoing relationship cardinality | Connectivity metric for the entity type |
|----|-------------|-----------------------------------------------------------------------|------------------------------------------|
| 1  | A           | 1000                                                                  | 1000                                     |
| 2  | B           | 1000 + 10000 + 5000                                                   | 16000                                    |
| 3  | C           | 10000 + 1000 + 2000                                                   | 13000                                    |
| 4  | D           | 5000 + 1000                                                           | 6000                                     |
| 5  | E           | 2000 + 4000                                                           | 6000                                     |
| 6  | F           | 4000                                                                  | 4000                                     |

3. Order entity types in decreasing order of connectivity: Sort the entity types in decreasing order of the connectivity metric value. For the example above, the data after such ordering will be as follows:
   a. B (16000)
   b. C (13000)
   c. D (6000)←Note that D/E have same value of connectivity metric. So their order can be interchanged.
   d. E (6000)
   e. F (4000)
   f. A (1000)

4. Building the Block by adding Data to it: The following steps show how to build a block by incrementally adding data to it:
   a. Assume the maximum limit on block size is N and there are K entity types in this group. Take N/K entities of entity type that has the highest connectivity in the above list that still has entities remaining to be processed. Call such entity type T. For example, when we just begin processing, B is the first type to be picked in this manner. Assume that all the entities picked above are added to a block being built—called currentBlock.
   b. Process each relation that connects entity types at distance 1 from entity type T so as to pick the instances related to the entities added to the block being built. If B is the entity type picked by step 4.a then entity types at distance 1 are A, D and C. All entities of type A, D, and C that are related to entities in currentBlock through relations A→B, B→C and B→D respectively are added to the current block. Also add the instances of the corresponding relationships between instances that have been added in this step.
   c. Repeat step 4.b for entity types at distance 2 (one more than previous step). In our example, entity types of distance 2 includes only E. So all entities of entity type E that are related to entities in currentBlock via relation C→E are added to currentBlock. (Note that such entities can only be of entity type C). Also add the instances of the corresponding relationships between instances that have been added in this step. Repeat steps similar to b, c each time increasing the distance value by one until the complete set of entity types belonging to this entity type group is exhausted.

5. Process Remaining Entities: Process all entities that have not been included in any block computed above. An entity processed as part of this step is not related to any other entity (which is the reason why such an entity did not get processed above). The processing of such entities is simple, since they can be grouped together in any order so as to build a block that satisfies the size limit.

Each time a relation/entity instance is added to a block, the relation/entity is marked DONE in the database in the table storing the corresponding information. A relation that is marked DONE doesn't need to be processed again. An entity that is market DONE may have to be processed again since the same entity may have to be added to multiple output blocks. However we do need to remember that an entity has been processed before so as to find all the "remaining" entities that are processed in step (5) above.

Another reason to remember which entities/relations have been processed before is to be able to process the data after a failure of the system (e.g., due to power failure). For example, loading of large amount of discovered data into a CMDB system can take several hours. If after an execution of several hours, the system is forced to shut down due to a catastrophic failure such as power shutdown, the said mechanism that marks the processed entities/relations as DONE will not require loading of the entities/relations that have already been loaded.

Best Case and Worst Case Situations for the Proposed Mechanism

The heuristic based mechanism provided works best when the distribution of the edges between the nodes is uniform. For example, assume a 1-N relation A B such that A has 1000 entities and B has 2000 entities and there are 2000 instances in the relation. The distribution is considered ideally uniform when the each entity in A is connected to approximately 2 entities in B i.e., each entity of A has two out going edges to B. The distribution will be highly non-uniform if e.g., 1 instance of A had all the 2000 edges (and the remaining had none).

Note that in the ideal situation, if all the relations were 1-1, the above algorithm will pull out N/K entities of each type. Since there are K entity types, the resulting block will consist of N entities, which is the maximum allowed block size. Also there will be no duplication of data between different blocks.

Let us consider the worst case where one instance of A (say A1) has 2000 edges. Assume each block could have 100 entities. There is no way to build a single block that includes all related entities that include A1. One way to build the blocks would be to replicate A1 in 20 blocks where each block includes 100 entities from B (strictly speaking the blocks will be of size 101—but let us ignore the slight overflow in the block size). Note that having to copy A1 into multiple blocks leads to a source of inefficiency since A1 has to be communicated twenty times and loaded into the system.

This example illustrates an extreme case for purposes of explanation but in general the goal is to avoid duplication of entities into multiple blocks. And the proposed mechanism achieves this goal to a very large extent esp. if the distribution of edges between the nodes is uniform.

Efficiency of Loading Data into a CMDB Achieved by the Current Approach

Note that performance comparison of the proposed approach with existing approaches (available in prior art) has not been presented because the authors are not aware of any relevant prior art that approaches this problem. The reason for this is primarily due to the fact that to our knowledge, discovery tools available as prior art do not discover significantly large amount of data so as to make the problem of loading the data into a CMDB a significant issue. For example, when the BDNA team tried to inquire from Vendors about their load testing of their systems, the Vendor had tried load testing using 10,000 CIs. The discovery system of BDNA easily discovers asset data that is multiple order of magnitude more than the said number (for large enterprises number of assets including hardware and software assets that potentially translate into CIs can be easily as large as several millions).

An example scenario that was tried with a particular Vendor of CMDB, around 76,000 CIs and 47,000 relation instances were loaded into a CMDB system which took about 7 hours. We do not present very precise Illustrations because the performance depends on several factors such as the kind of hardware machine used for running the CMDB, the effect of network load, the target CMDB system etc. (different Vendors perform differently). As a result we have presented approximate results based on few runs of the dataset that we implemented. Also note that doing such performance studies requires significant amount of resources making it difficult to do such research. Also, the performance impact can be easily analyzed without doing actual performance studies (which makes such study less important).

The important fact to note is that if a significant number of CIs are duplicated during the loading of a CMDB, the loading of the data to the CMDB can take extra time running into several hours. If customers need to load the CMDB data on a regular basis (for example, weekly) such performance makes significant impact on the usability of system.

To discuss efficiency of the presented approach we present two alternative approaches that have drawbacks compared to the presented approach.

Process One Relation at a Time

This approach takes one relation at a time and processes entities related by the given relationship. If an entity type E1 is connected to two other entity types E2 and E3 by two separate relationships R1 and R2, entities from type E1 will be communicated twice—once while processing relation R1 and again while processing R2. Essentially, an entity becomes part of as many blocks as the relations that it forms part of. Note that if no entity type in the graph was connected to more than one other entity type, this approach will perform as well as the presented approach. However if entity types were connected to more than one other entity types, this approach requires significant duplication of entities in blocks. For example, if on an average each entity type was related to two other entity types this approach will send twice as many entities to the CMDB as the presented approach.

Incrementally Grow a Block with Unordered Nodes

This approach doesn't provide any specific order to the node as provided by the approach presented in the application. Assume the maximum block size is N entities and there are K entity types in a block. This approach takes the graph as provided and starts with any entity type and adds N/K entities of the said entity type to the current block being built. It further takes all entities that are related to the entities in the current block at distance 1 and continues to add more and more entities by increasing the distance by 1 each time. The building of the current block needs to stop if adding more entities causes the block size to exceed N. Note that the drawback of this approach is that since the entity types are not ordered in any particular order, the number of related entities being added at each step becomes unpredictable. For example consider the graph shown in FIG. 28.

The graph has 4 entity types A, B, C, D and three relationships A→B, B→C, C→D. Assume cardinalities of relations as follows: A→B as 1000, B→C as 2,000, and C→D as 4,000. Also assume that each entity of type A is related to two entities of type B; each entity of type B is related to two entities of type C; each entity of type C is related to two entities of type D. Since nodes are picked in a random order it is possible that the entity types are picked in the order A, B, C, D. Assume, that the block size specified for the project (value if N) is 400 entities. Since number of entity types in the group (value of K) is 4, the value of N/K is 100. If 100 nodes of entity type A are picked, it is likely to bring in 200 entities of type B which will further bring in 400 entities of type C which will further try to bring in 800 entities of type D. Of course, since the block size limit is 400, so the block accordingly will consist of 100 entities of type A, 200 entities of type B and 100 entities of type C (we need to bring in only a subset of the related entities of type C). Note that such a block will result is duplication of several entities in subsequent blocks. Since only $\frac{1}{4}^{th}$ of the entities of type C related to entities of type B were used, the remaining $\frac{3}{4}^{th}$ of the entities of type B (150 entities) must be duplicated in subsequent blocks (at least). Furthermore, since none of the entities of type D were included in the block, the corresponding related entities of type C (100 entities) need to be included in subsequent blocks as well to get the entities of type D. So in a block of 400 entities if 250 entities are duplicated, this causes approximately 250/400100 i.e., 60% extra overhead.

On the other had let us compare the performance based on the best mode approach discussed in this application. The connectivity metrics for the various entity types is A=1000, B=1000+2000=3000, C=2000+4000=6000, D=4000. By sorting the entity types in reverse order of the connectivity metric we get the list C, D, B A (we refer to the list as L). As explained above, the value of maximum block size (N) is 400 and the number of entity types in the group (K) is 4. The value of N/K is 400/4=100. The first entity type in the list L is picked which is C. Adding 100 entities of type C, the next step picks all related entities of type C and D that are at distance 1. For 100 entities of type C, there are 50 entities of type B and 200 entities of type D. The next step picks entities at distance 2, i.e., entities of type A related to the block built so far. Since the block built so far consists of 50 entities of type B, there are only 25 entities of type A. The resulting block consists of 100 C's, 200 D's, 50 B's and 25 A's=total of 375 entities. The block was constructed within the required limit. Note that the important feature of the block so constructed is no entities need to be duplicated in subsequent blocks since all related entities have been included in the block.

What is claimed is:

1. A method for transforming attribute data in a first data model associated with a source system to a second data model associated with a target system, the method comprising:
    storing, in a parent object, a first set of transformation rules that transform a first set of attributes from the first data model associated with the source system into the second data model associated with the target system, wherein the first set of transformation rules are common to a plurality of different subtype objects;
    storing, in a subtype object, a second set of transformation rules that transform a second set of attributes from the first data model associated with the source system into the second data model associated with the target system, wherein the second set of attributes are specific to an asset, and wherein the subtype object inherits all rules from the first set of transformation rules for which the subtype object shares a parent-subtype object relationship;
    extracting attribute data from the source system, wherein a subset of the extracted attribute data from the source system is specific to the asset stored in the source system, and wherein each asset on the source system has a unique set of attribute data;
    storing the extracted attribute data from the source system into a transactional store,
    generating a report using the transactional store, wherein the report assigns the unique set of attribute data to represent the stored asset in the source system;
    identifying that the asset stored in the source system is also stored in a target system;
    retrieving transformation rules stored in the subtype object to transform the subset of extracted attribute data specific to the identified asset in the source system in the first data model into the second data model that is compatible with the target system, wherein the retrieved transformation rules includes the first set of transformation rules inherited by the subtype object by way of the parent-subtype object relationship;
    transforming the extracted attribute data from the source system in the first data model into the second data model associated with the target system, wherein the transformation from the first data model into the second data model between the source system and the target system is performed using the transformation rules that is specific to the source system and the target system; and
    exporting the transformed attribute data of the source system to the target system.

2. The method of claim 1, wherein updates made to the first set of transformation rules stored in an updated parent object are automatically inherited by each of the associated subtype objects which share the parent-subtype object relationship with the updated parent object.

3. The method of claim 1, wherein transforming the extracted attribute data for an asset from the source system in the first data model into the second data model associated with the target system includes:
    executing the transformation rules stored in the parent object common to a plurality of different assets, and
    executing the transformation rules stored in the subtype object specific to the asset,
    wherein there is no dependency between the first and second set of transformation rules so that the transformation rules can be executed in any order.

4. The method of claim 1, further comprising tracking a progress of the exporting of the transformed attribute data from the source system to the target system, wherein the tracked progress facilitates restarts of the exporting from a last committed transaction.

5. The method of claim 4, wherein a restart of the exporting of the transformed attribute data is initiated based on a detected error or warning condition that occurred during the exporting.

6. The method of claim 1, wherein the exporting of the transformed attribute data from the source system to the target system is performed as a stateless transfer such that the transformed attribute data is inserted into the target system without finding if information already exists about that asset in the target system.

7. The method of claim 1, wherein the exporting of the transformed attribute data from the source system to the target system is performed as a state-based transfer includes:
    identifying whether an entry for the asset exists within the target system,
    computing a difference between data stored in the existing entry in the target system for the asset and the transformed attribute data from the source system, and determining any modifications to the existing entry needed based on the transformed attribute data being exported from the source system.

8. The method of claim 1, wherein transforming the extracted attribute data includes merging two or more separate attribute data from the source system to be stored as a single attribute data at the target system.

9. The method of claim 1, wherein transforming the extracted attribute data includes splitting a single attribute data from the source system to be stored as two or more separate attribute data at the target system.

10. A system for transforming attribute data in a first data model associated with a source system to a second data model associated with a target system, the system comprising:
 a database that:
  stores, in a parent object, a first set of transformation rules that transform a first set of attributes from the first data model associated with the source system into the second data model associated with the target system, wherein the first set of transformation rules are common to a plurality of different subtype objects, and
  stores, in a subtype object, a second set of transformation rules that transform a second set of attributes from the first data model associated with the source system into the second data model associated with the target system, wherein the second set of attributes are specific to an asset, and wherein the subtype object inherits all rules from the first set of transformation rules for which the subtype object shares a parent-subtype object relationship;
 a computing device that executes instructions stored in memory to:
  extract attribute data from the source system, wherein a subset of the extracted attribute data from the source system is specific to the asset stored in the source system, and wherein each asset on the source system has a unique set of attribute data,
  store the extracted attribute data from the source system into a transactional store,
  generate a report using the transactional store, wherein the report assigns the unique set of attribute data to represent the stored asset in the source system,
  identify that the asset stored in the source system is also stored in a target system, and
  retrieve transformation rules stored in the subtype object to transform the subset of extracted attribute data specific to the identified asset in the source system in the first data model into the second data model that is compatible with the target system, wherein the retrieved transformation rules includes the first set of transformation rules inherited by the subtype object by way of the parent-subtype object relationship;
 a transformation engine that transforms the extracted attribute data from the source system in the first data model into the second data model associated with the target system, wherein the transformation from the first data model into the second data model between the source system and the target system is performed using the retrieved transformation rules that are specific to the source system and the target system; and
 export adaptors for exporting the transformed attribute data of the source system to the target system.

11. The system of claim 10, wherein updates made to the first set of transformation rules stored in an updated parent object are automatically inherited by each of the associated subtype objects which share the parent-subtype object relationship with the updated parent object.

12. The system of claim 10, wherein transforming the extracted attribute data for an asset from the source system in the first data model into the second data model associated with the target system performed by the transformation engine includes:
 executing the transformation rules stored in the parent object common to a plurality of different assets, and
 executing the transformation rules stored in the subtype object specific to the asset,
 wherein there is no dependency between the first and second set of transformation rules so that the transformation rules can be executed in any order.

13. The system of claim 10, wherein the computing device further tracks a progress of the exporting of the transformed attribute data from the source system to the target system performed by the export adaptor, wherein the tracked progress facilitates restarts of the exporting from a last committed transaction.

14. The system of claim 13, wherein a restart of the exporting of the transformed attribute data performed by the export adaptor is initiated by the computing device based on a detected error or warning condition that occurred during the exporting.

15. The system of claim 10, wherein the exporting of the transformed attribute data from the source system to the target system is performed by the export adaptor as a stateless transfer such that the transformed attribute data is inserted by the export adaptor into the target system without finding if information already exists about that asset in the target system.

16. The system of claim 10, wherein the exporting of the transformed attribute data from the source system to the target system is performed by the export adaptor as a state-based transfer that includes the computing device:
 identifying whether an entry for the asset exists within the target system,
 computing a difference between data stored in the existing entry in the target system for the asset and the transformed attribute data from the source system, and
 determining any modifications to the existing entry needed based on the transformed attribute data being exported from the source system.

17. The system of claim 10, wherein the transformation of the extracted attribute data by the transformation engine includes merging two or more separate attribute data from the source system to be stored as a single attribute data at the target system.

18. The system of claim 10, wherein the transformation of the extracted attribute data by the transformation engine includes splitting a single attribute data from the source system to be stored as two or more separate attribute data at the target system.

19. A non-transitory computer-readable storage medium having embodied thereon a program, the program being executable by a processor to perform a method for transforming attribute data in a first data model associated with a source system to a second data model associated with a target system, the method comprising:
 storing, in a parent object, a first set of transformation rules that transform a first set of attributes from the first data model associated with the source system into the second data model associated with the target system, wherein the first set of transformation rules are common to a plurality of different subtype objects;

storing, in a subtype object, a second set of transformation rules that transform a second set of attributes from the first data model associated with the source system into the second data model associated with the target system, wherein the second set of attributes are specific to an asset, and wherein the subtype object inherits all rules from the first set of transformation rules for which the subtype object shares a parent-subtype object relationship;

extracting attribute data from the source system, wherein a subset of the extracted attribute data from the source system is specific to the asset stored in the source system, and wherein each asset on the source system has a unique set of attribute data;

storing the extracted attribute data from the source system into a transactional store, generating a report using the transactional store, wherein the report assigns the unique set of attribute data to represent the stored asset in the source system;

identifying that the asset stored in the source system is also stored in a target system;

retrieving transformation rules stored in the subtype object to transform the subset of extracted attribute data specific to the identified asset in the source system in the first data model into the second data model that is compatible with the target system, wherein the retrieved transformation rules includes the first set of transformation rules inherited by the subtype object by way of the parent-subtype object relationship;

transforming the extracted attribute data from the source system in the first data model into the second data model associated with the target system, wherein the transformation from the first data model into the second data model between the source system and the target system is performed using the transformation rules that is specific to the source system and the target system; and exporting the transformed attribute data of the source system to the target system.

\* \* \* \* \*